United States Patent
Cheng et al.

(10) Patent No.: US 10,861,301 B1
(45) Date of Patent: Dec. 8, 2020

(54) MULTIFUNCTIONAL SMART HOLDER AND CONTROL METHOD THEREOF

(71) Applicants: Chia-Pao Cheng, Hsinchu (TW); Pao-Lin Guo, Hsinchu (TW); An-Tsun Teng, Hsinchu (TW)

(72) Inventors: Chia-Pao Cheng, Hsinchu (TW); Pao-Lin Guo, Hsinchu (TW); An-Tsun Teng, Hsinchu (TW)

(73) Assignee: ZEALIO ELECTRONICS CO., LTD., Hsinchu (TW)

( * ) Notice: Subject to any disclaimer, the term of this patent is extended or adjusted under 35 U.S.C. 154(b) by 0 days.

(21) Appl. No.: 16/449,926

(22) Filed: Jun. 24, 2019

(51) Int. Cl.
| | | |
|---|---|---|
| *G08B 13/00* | (2006.01) | |
| *G08B 13/16* | (2006.01) | |
| *H02J 50/10* | (2016.01) | |
| *H02H 9/04* | (2006.01) | |
| *B60R 11/00* | (2006.01) | |
| *H04W 4/80* | (2018.01) | |
| *H04W 4/02* | (2018.01) | |
| *H02J 50/90* | (2016.01) | |

(52) U.S. Cl.
CPC .......... *G08B 13/1654* (2013.01); *B60R 11/00* (2013.01); *H02H 9/042* (2013.01); *H02J 50/10* (2016.02); *H02J 50/90* (2016.02); *H04W 4/027* (2013.01); *H04W 4/80* (2018.02); *B60R 2011/0003* (2013.01)

(58) Field of Classification Search
CPC ...... G08B 13/1654; H02J 50/90; H02J 50/10; H04W 4/80; H04W 4/027; B60R 11/00; B60R 2011/0003; H02H 9/042
See application file for complete search history.

(56) References Cited

U.S. PATENT DOCUMENTS

| | | | | |
|---|---|---|---|---|
| 9,834,104 B2* | 12/2017 | Tsukamoto | ............. | B60L 58/12 |
| 2012/0153894 A1* | 6/2012 | Widmer | .................. | H02J 50/90 |
| | | | | 320/108 |
| 2013/0015951 A1* | 1/2013 | Kuramochi | ............. | B60L 53/16 |
| | | | | 340/5.64 |
| 2013/0249478 A1* | 9/2013 | Hirano | .................. | H02J 7/0044 |
| | | | | 320/108 |
| 2014/0103871 A1* | 4/2014 | Maikawa | ............ | H02J 7/00034 |
| | | | | 320/108 |

(Continued)

*Primary Examiner* — Quang Pham
(74) *Attorney, Agent, or Firm* — Che-Yang Chen; Law Office of Michael Chen

(57) ABSTRACT

A multifunctional smart holder and a control method thereof. The multifunctional smart holder is placed on a vehicle device and used for holding a portable device. The multifunctional smart holder comprises: a near-field sensing circuit, a wireless charging circuit and a control circuit. The near-field sensing circuit performs a near-field sensing program to sense a near-field distance between an object to be tested and the multifunctional smart holder to generate a near-field sensing signal. The wireless charging circuit performs a wireless charging program. The control circuit determines whether the portable device is to be placed in the multifunctional smart holder, or taken out from the multifunctional smart holder according to the near-field sensing signal, so that the multifunctional smart holder clamps or releases the portable device, and performs a program for mitigating noise interference to reduce noise generated by the wireless charging circuit when performing the wireless charging program.

28 Claims, 17 Drawing Sheets

(56) References Cited

U.S. PATENT DOCUMENTS

| | | | |
|---|---|---|---|
| 2014/0103872 A1* | 4/2014 | Ichikawa | B60L 53/126 320/108 |
| 2014/0114504 A1* | 4/2014 | Yamashita | B60R 25/40 701/2 |
| 2014/0336892 A1* | 11/2014 | Braunberger | G01C 23/00 701/70 |
| 2015/0278038 A1* | 10/2015 | Halker | B60L 53/38 714/3 |
| 2016/0121735 A1* | 5/2016 | Sugano | B60L 58/18 320/109 |
| 2016/0141919 A1* | 5/2016 | Ohashi | B60L 53/62 320/108 |
| 2016/0257211 A1* | 9/2016 | Kimura | B60L 11/1818 |
| 2016/0280077 A1* | 9/2016 | Tsukamoto | B60L 53/126 |
| 2016/0288653 A1* | 10/2016 | Tsukamoto | H02J 7/025 |
| 2016/0288665 A1* | 10/2016 | Tsukamoto | H02J 7/025 |
| 2016/0297312 A1* | 10/2016 | Tsukamoto | H02J 50/80 |
| 2016/0368391 A1* | 12/2016 | Kojima | B60L 53/16 |
| 2017/0113557 A1* | 4/2017 | Tsukamoto | H02J 7/0027 |
| 2018/0001835 A1* | 1/2018 | Corso | H04M 1/04 |
| 2018/0027033 A1* | 1/2018 | Kamstrup | H04M 1/7253 370/310 |
| 2018/0152040 A1* | 5/2018 | Yeon | H02J 7/027 |
| 2018/0166922 A1* | 6/2018 | Chung | H04M 1/72569 |
| 2018/0177075 A1* | 6/2018 | Kweon | H01F 38/14 |
| 2018/0190420 A1* | 7/2018 | Tsai | H01F 27/02 |
| 2018/0341289 A1* | 11/2018 | Schachter | G06F 1/1632 |
| 2019/0007541 A1* | 1/2019 | Robillard | B60K 37/02 |
| 2019/0123575 A1* | 4/2019 | Cha | H02J 7/0042 |
| 2019/0156654 A1* | 5/2019 | Ramos | G08B 21/24 |
| 2019/0217788 A1* | 7/2019 | Buchhalter | F16M 13/00 |
| 2019/0237985 A1* | 8/2019 | Piunti | H02J 50/10 |
| 2019/0249697 A1* | 8/2019 | Liu | F16B 2/12 |
| 2019/0268457 A1* | 8/2019 | Liu | H04M 1/12 |
| 2019/0283645 A1* | 9/2019 | Garcia Salgado | H02J 50/10 |
| 2019/0386515 A1* | 12/2019 | Leem | H02J 50/12 |

* cited by examiner

MULTIFUNCTIONAL SMART HOLDER AND CONTROL METHOD THEREOF

BACKGROUND OF THE INVENTION

Field of Invention

The present invention relates to a multifunctional smart holder and a control method thereof, and more particularly to a multifunctional smart holder and a control method thereof capable of integrating a wireless charging circuit and a near-field sensing circuit in the same multifunctional smart holder, preventing misjudgment when the near-field sensing circuit performs a near-field sensing program caused by noise interference generated during a wireless charging program performed by the wireless charging circuit, enabling the near-field sensing circuit to self-learn, and not affecting the judgment of the multifunctional smart holder due to environmental changes.

Related Art

Please refer to FIG. 1, which shows a block diagram of a prior art multifunctional smart holder 10. The multifunctional smart holder 10 can be placed on a vehicle device 19, and the multifunctional smart holder 10 can be used to hold a portable device 18. As shown in FIG. 1, the multifunctional smart holder 10 comprises a control circuit 11 and a wireless charging circuit 12. The wireless charging circuit 12 is used in the multifunctional smart holder 10 to perform a wireless charging program. When the multifunctional smart holder 10 holds the portable device 18, the wireless charging circuit 12 can charge the portable device 18 wirelessly. A disadvantage of the multifunctional smart holder 10 is that only one wireless charging circuit 12 can be included alone, and a near-field sensing circuit cannot be integrated into the multifunctional smart holder 10. The reason is that if the wireless charging circuit 12 and a near-field sensing circuit are integrated in the same multifunctional smart holder 10, noise generated by the wireless charging circuit 12 while performing the wireless charging program will interfere with the near-field sensing circuit. Such interference will cause misjudgment when the near-field sensing circuit performs a near-field sensing program. Therefore, the multifunctional smart holder 10 cannot solve the problem that the wireless charging circuit 12 interferes with the near-field sensing circuit, and thus the multifunctional smart holder 10 cannot and is unable to integrate the wireless charging circuit 12 with a near-field sensing circuit. As a result, the functions of the multifunctional smart holder 10 are made very constricted and very limited.

In view of this, the present invention provides a multifunctional smart holder and a control method thereof capable of integrating a wireless charging circuit and a near-field sensing circuit in the same multifunctional smart holder, preventing misjudgment when the near-field sensing circuit performs a near-field sensing program caused by noise interference generated during a wireless charging program performed by the wireless charging circuit, enabling the near-field sensing circuit to self-learn, and not affecting the judgment of the multifunctional smart holder due to environmental changes.

SUMMARY OF THE INVENTION

In one aspect, the present invention provides a multifunctional smart holder for placing on a vehicle device, and the multifunctional smart holder is used for holding a portable device, the multifunctional smart holder comprises: a near-field sensing circuit for performing a near-field sensing program to sense a near-field distance between an object to be tested and the multifunctional smart holder to generate a near-field sensing signal; a wireless charging circuit for performing a wireless charging program on the portable device; and a control circuit for determining whether the portable device is to be placed in the multifunctional smart holder, or is to be taken out from the multifunctional smart holder according to the near-field sensing signal, so that the multifunctional smart holder clamps or releases the portable device; wherein the control circuit performs a program for mitigating noise interference to reduce noise in the near-field sensing signal, wherein at least part of the noise is generated when the wireless charging circuit performs the wireless charging program.

In a preferred embodiment, the near-field sensing circuit comprises a placement sensor, and the object to be tested comprises the portable device, and the near-field sensing program comprises a placement sensing program to sense a device distance between the portable device and the multifunctional smart holder to generate a device sensing signal in the near-field sensing signal, so that the control circuit determines that the portable device is to be placed in the multifunctional smart holder, and causes the multifunctional smart holder to clamp the portable device.

In a preferred embodiment, the near-field sensing circuit further comprises a take-out sensor, the object to be tested further comprises a human body part, and the near-field sensing program further comprises a take-out sensing program to sense a human body distance between the human body part and the multifunctional smart holder to generate a human body sensing signal in the near-field sensing signal, so that the control circuit determines that the portable device is to be taken out from the multifunctional smart holder, and causes the multifunctional smart holder to release the portable device.

In a preferred embodiment, the control circuit comprises: an analog-to-digital converter (ADC) for converting the near-field sensing signal into a digital near-field sensing signal; a median filter coupled to the analog-to-digital converter for performing a median filtering operation on the digital near-field sensing signal to filter out a surge noise in the digital near-field sensing signal; and a slew rate limiter coupled to the analog-to-digital converter for performing a slew rate limiting operation on the digital near-field sensing signal to filter out a drastic noise in the digital near-field sensing signal; wherein the control circuit generates an operation signal according to results of the median filtering operation and the slew rate limiting operation, and the program for mitigating noise interference comprises the median filtering operation and the slew rate limiting operation.

In the foregoing implementations, the control circuit preferably further comprises a low-pass filter for performing a low-pass filtering operation on the operation signal to generate a low-pass filter signal; wherein the control circuit generates a judgement signal according to whether a difference between the operation signal and the low-pass filter signal is greater than a preset threshold value to determine whether the portable device is to be placed in the multifunctional smart holder, or is to be taken out from the multifunctional smart holder; wherein the program for mitigating noise interference further comprises the low-pass filtering operation.

In the foregoing implementation, the low-pass filtering operation preferably comprises a moving average operation, wherein the low-pass filter performs the moving average operation on the operation signal to achieve low-pass filtering of the operation signal to generate the low-pass filter signal.

In the foregoing implementations, the low-pass filtering operation preferably comprises a self-learning procedure, wherein the low-pass filter performs the self-learning procedure on the operation signal to achieve low-pass filtering of the operation signal to generate the low-pass filter signal; wherein the self-learning procedure comprises: (A) calculating an initial average value of the operation signal; (B) comparing the operation signal with the initial average value; (C) when the operation signal is not less than the initial average value, increasing the initial average value to generate the low-pass filter signal; (D) when the operation signal is less than the initial average value, reducing the initial average value to generate the low-pass filter signal; (E) comparing the operation signal with the low-pass filter signal; (F) when the operation signal is not less than the low-pass filter signal, increasing the low-pass filter signal to generate the new low-pass filter signal; (G) when the operation signal is less than the low-pass filter signal, reducing the low-pass filter signal to generate the new low-pass filter signal; and (H) repeating the step (E).

In the foregoing implementations, the control circuit preferably further comprises a debounce circuit for performing a debounce operation on the difference, the judgement signal or the operation signal to prevent multiple signals in the near-field sensing signal from triggering noise; wherein the program for mitigating noise interference further comprises the debounce operation.

In the foregoing implementations, the debounce circuit preferably comprises a hysteresis circuit, and the debounce operation comprises a hysteresis operation to prevent the multiple signals from triggering noise.

In a preferred embodiment, the control circuit comprises a micro-control unit (MCU) for using as at least one of the analog-to-digital converter, the median filter, the slew rate limiter, the low-pass filter and the debounce circuit.

In a preferred embodiment, the multifunctional smart holder further comprises: a driving motor for extending or contracting two clamping arms of the multifunctional smart holder with the multifunctional smart holder, wherein:

when the denoised near-field sensing signal determines that the multifunctional smart holder needs to clamp the portable device, the control circuit notifies the driving motor to contract the two clamping arms of the multifunctional smart holder, so that the multifunctional smart holder clamps the portable device; and when the denoised near-field sensing signal determines that the multifunctional smart holder needs to release the portable device, the control circuit notifies the driving motor to extend the two clamping arms of the multifunctional smart holder, so that the multifunctional smart holder releases the portable device.

In a preferred embodiment, the multifunctional smart holder further comprises: a vibration sensor for detecting whether a vehicle body placed with the multifunctional smart holder has a vibration, wherein when the vibration sensor detects that the vehicle body has a vibration, the vibration sensor notifies the control circuit to turn on a lighting device of the vehicle body to light up the interior of the vehicle body, display the brand inside the vehicle body or generate a warning function.

In a preferred embodiment, the multifunctional smart holder further comprises: a gravity sensor (G-sensor) for detecting whether a vehicle body placed with the multifunctional smart holder is moving, wherein when the gravity sensor detects that the vehicle body is moving, the gravity sensor notifies the control circuit to turn on an in-vehicle anti-theft alarm system of the vehicle body, thereby enabling the portable device and the multifunctional smart holder to perform an identity authentication program by Bluetooth connection for anti-theft alarm.

In a preferred embodiment, the multifunctional smart holder further comprises: a Bluetooth device for connecting with the portable device via Bluetooth, thereby when the portable device plays music or a video stored in the portable device, the Bluetooth device notifies the control circuit to cause the control circuit to notify a sound playback device in the vehicle body to output the music or video of the portable device; or when an identity authentication program is required, the Bluetooth device notifies the control circuit to cause the control circuit to turn on an in-vehicle anti-theft alarm system of the vehicle body, thereby enabling the portable device and the multifunctional smart holder to perform an identity authentication program by Bluetooth connection for anti-theft alarm.

In a preferred embodiment, the multifunctional smart holder further comprises: an identification component for connecting to the multifunctional smart holder to perform an identity authentication program.

In a preferred embodiment, the multifunctional smart holder further comprises: a low frequency receiving circuit for detecting a low frequency signal in a surrounding environment of the vehicle body, when the low frequency receiving circuit detects that the surrounding environment of the vehicle body has a low frequency signal generated, the control circuit automatically adjusts a frequency of the wireless charging circuit to avoid the low frequency signal, and when the low frequency receiving circuit did not detect that the surrounding environment of the vehicle body has a low frequency signal, the control circuit automatically resets to the frequency of the best charging efficiency of the wireless charging circuit.

In another aspect, the present invention provides a control method of a multifunctional smart holder, comprising following steps of: providing a multifunctional smart holder for placing on a vehicle device, and the multifunctional smart holder being used for holding a portable device; the multifunctional smart holder performing a near-field sensing program to sense a near-field distance between an object to be tested and the multifunctional smart holder to generate a near-field sensing signal; the multifunctional smart holder performing a wireless charging program; the multifunctional smart holder determining whether the portable device being placed in the multifunctional smart holder, or being taken out from the multifunctional smart holder according to the near-field sensing signal, so that the multifunctional smart holder clamping or releasing the portable device; and the multifunctional smart holder performing a program for mitigating noise interference to reduce noise in the near-field sensing signal, wherein at least part of the noise is generated when performing the wireless charging program.

In a preferred embodiment, the near-field sensing program comprises a placement sensing program to sense a device distance between the portable device and the multifunctional smart holder to generate a device sensing signal in the near-field sensing signal, in order to determine that the portable device is to be placed in the multifunctional smart holder, and causes the multifunctional smart holder to clamp the portable device.

In a preferred embodiment, the near-field sensing program further comprises a take-out sensing program to sense a human body distance between a human body part and the multifunctional smart holder to generate a human body sensing signal in the near-field sensing signal, so that the control circuit determines that the portable device is to be taken out from the multifunctional smart holder, and causes the multifunctional smart holder to release the portable device.

In a preferred embodiment, the program for mitigating noise interference comprises following steps of: (A) converting the near-field sensing signal into a digital near-field sensing signal; (B) performing a median filtering operation on the digital near-field sensing signal to filter out a surge noise in the digital near-field sensing signal; (C) performing a slew rate limiting operation on the digital near-field sensing signal to filter out a drastic noise in the digital near-field sensing signal; and (D) generating an operation signal according to results of the median filtering operation and the slew rate limiting operation.

In the foregoing implementations, the program for mitigating noise interference preferably further comprises following steps of: (E) performing a low-pass filtering operation on the operation signal to generate a low-pass filter signal; wherein the multifunctional smart holder generates a judgement signal according to whether a difference between the operation signal and the low-pass filter signal is greater than a preset threshold value to determine whether the portable device is to be placed in the multifunctional smart holder, or is to be taken out from the multifunctional smart holder.

In the foregoing implementations, the low-pass filtering operation preferably comprises a moving average operation to perform the moving average operation on the operation signal to achieve low-pass filtering of the operation signal to generate the low-pass filter signal.

In the foregoing implementations, the low-pass filtering operation preferably comprises a self-learning procedure to perform the self-learning procedure on the operation signal to achieve low-pass filtering of the operation signal to generate the low-pass filter signal; wherein the self-learning procedure comprises: (E1) calculating an initial average value of the operation signal; (E2) comparing the operation signal with the initial average value; (E3) when the operation signal is not less than the initial average value, increasing the initial average value to generate the low-pass filter signal; (E4) when the operation signal is less than the initial average value, reducing the initial average value to generate the low-pass filter signal; (E5) comparing the operation signal with the low-pass filter signal; (E6) when the operation signal is not less than the low-pass filter signal, increasing the low-pass filter signal to generate the new low-pass filter signal; (E7) when the operation signal is less than the low-pass filter signal, reducing the low-pass filter signal to generate the new low-pass filter signal; and (E8) repeating the step (E5).

In the foregoing implementations, the program for mitigating noise interference preferably further comprises a debounce operation for performing a debounce operation on the difference, the judgement signal or the operation signal to prevent multiple signals in the near-field sensing signal from triggering noise.

In the foregoing implementations, the debounce operation preferably comprises a hysteresis operation to prevent the multiple signals from triggering noise.

In a preferred embodiment, the control method of the multifunctional smart holder further comprises: extending or contracting two clamping arms of the multifunctional smart holder, wherein: when the denoised near-field sensing signal determines that the multifunctional smart holder needs to clamp the portable device, contracts the two clamping arms of the multifunctional smart holder, so that the multifunctional smart holder clamps the portable device; and when the denoised near-field sensing signal determines that the multifunctional smart holder needs to release the portable device, extends the two clamping arms of the multifunctional smart holder, so that the multifunctional smart holder releases the portable device.

In a preferred embodiment, the control method of the multifunctional smart holder further comprises: detecting whether a vehicle body placed with the multifunctional smart holder has a vibration, wherein when detecting that the vehicle body has a vibration, turns on a lighting device of the vehicle body to light up the interior of the vehicle body, display the brand inside the vehicle body or generate a warning function.

In a preferred embodiment, the control method of the multifunctional smart holder further comprises: detecting whether a vehicle body placed with the multifunctional smart holder is moving, wherein when detects that the vehicle body is moving, turns on an in-vehicle anti-theft alarm system of the vehicle body, thereby enabling the portable device and the multifunctional smart holder to perform an identity authentication program by Bluetooth connection for anti-theft alarm.

In a preferred embodiment, the control method of the multifunctional smart holder further comprises: connecting the multifunctional smart holder and the portable device with each other via Bluetooth, thereby when the portable device playing music or a video stored in the portable device, the multifunctional smart holder notifying a sound playback device in the vehicle body to output the music or video of the portable device; or when an identity authentication program being required, the multifunctional smart holder turning on an in-vehicle anti-theft alarm system of the vehicle body, thereby enabling the portable device and the multifunctional smart holder to perform an identity authentication program by Bluetooth connection for anti-theft alarm.

In a preferred embodiment, the control method of the multifunctional smart holder further comprises: connecting the multifunctional smart holder with an identification component to perform an identity authentication program, wherein when a low frequency receiving circuit detects that a surrounding environment of the vehicle body has a low frequency signal generated, the control circuit automatically adjusts a frequency of the wireless charging circuit to avoid the low frequency signal, and when the low frequency receiving circuit did not detect that the surrounding environment of the vehicle body has a low frequency signal, the control circuit automatically resets to the frequency of the best charging efficiency of the wireless charging circuit.

The objects, technical content, features and efficacies achieved by the present invention will be more readily understood with the following detailed description of the specific embodiments.

DETAILED DESCRIPTION OF THE INVENTION

The above and other technical contents, features and efficacies of the present invention will be apparent from the following detailed description of preferred embodiments with reference to the accompanying drawings. The drawings in the present invention are intended to illustrate the functional relationship between the various devices and the various elements, and the shapes, thicknesses, and widths are not drawn to scale.

Figure 1:
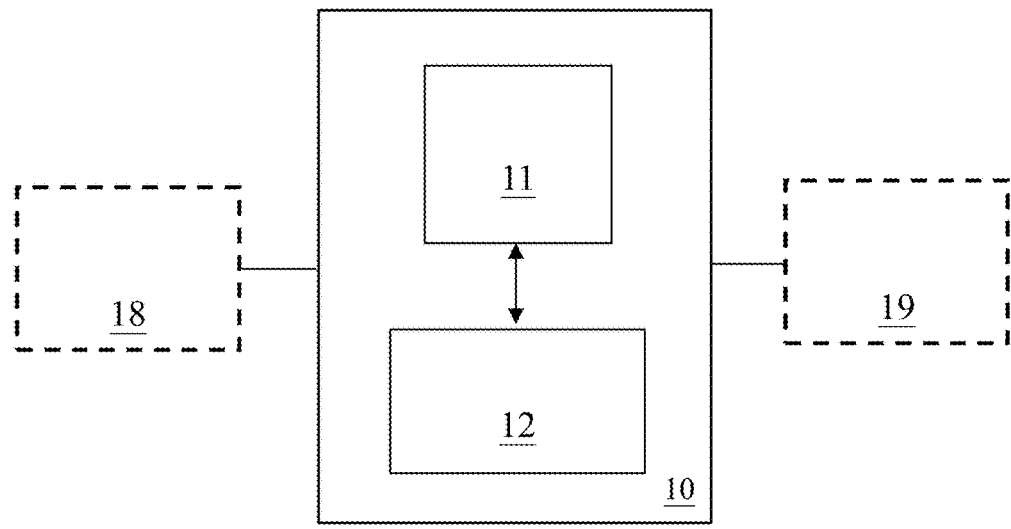
FIG. 1 is a block diagram of a prior art multifunctional smart holder.
Figure 2:
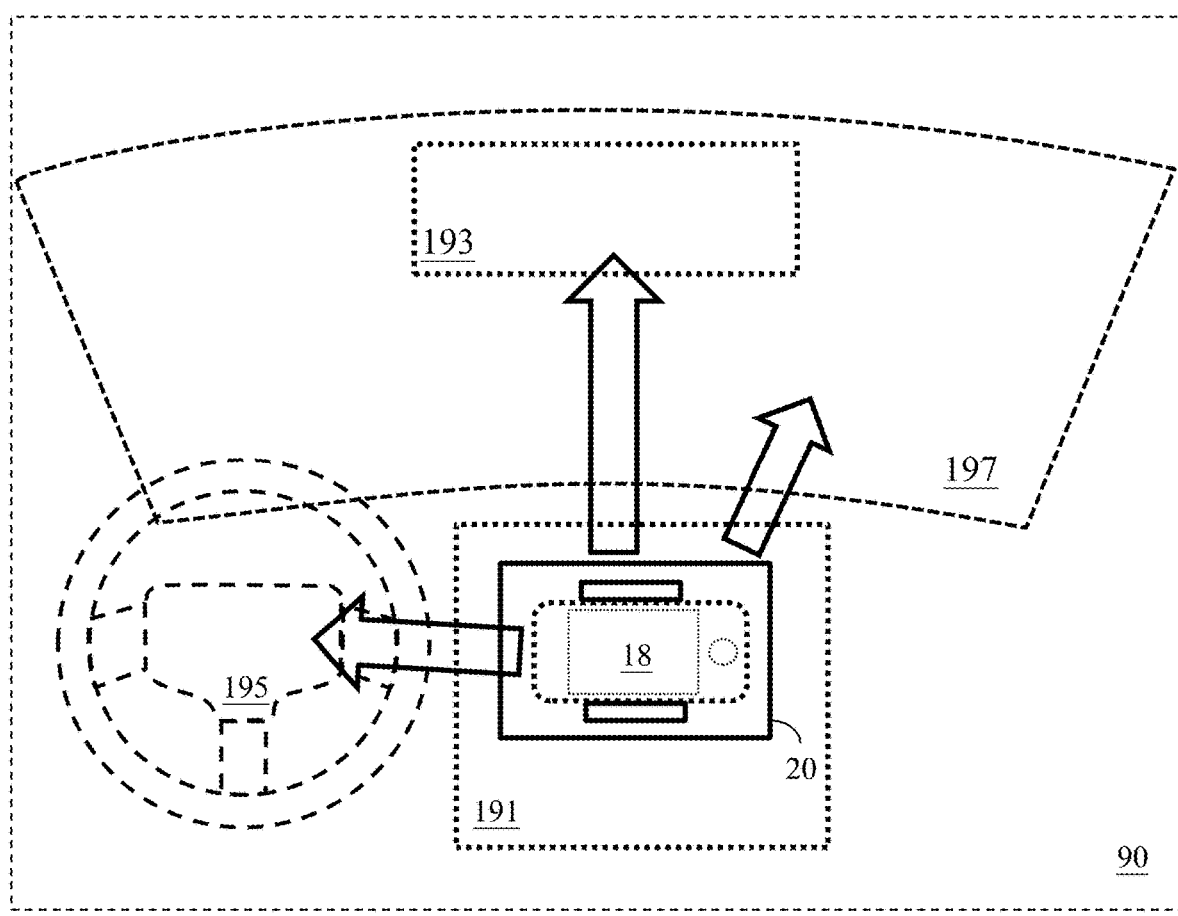
FIG. 2 is a schematic diagram of a multifunctional smart holder according to an embodiment of the present invention.

FIG. 2 is a schematic diagram of a multifunctional smart holder 20 according to an embodiment of the present invention. As shown in the figure, the multifunctional smart holder 20 according to the present invention is used for installing on a vehicle device in a vehicle body 90. The vehicle device is, for example but not limited to, a console 191, a rear view mirror 193, a steering wheel 195, a windshield 197, etc. as shown in the drawing; of course, the multifunctional smart holder 20 can also be mounted on other vehicle devices in the vehicle body 90, as long as the multifunctional smart holder 20 can be kept in the vehicle body 90 when the multifunctional smart holder 20 is in operation.

Figure 3:
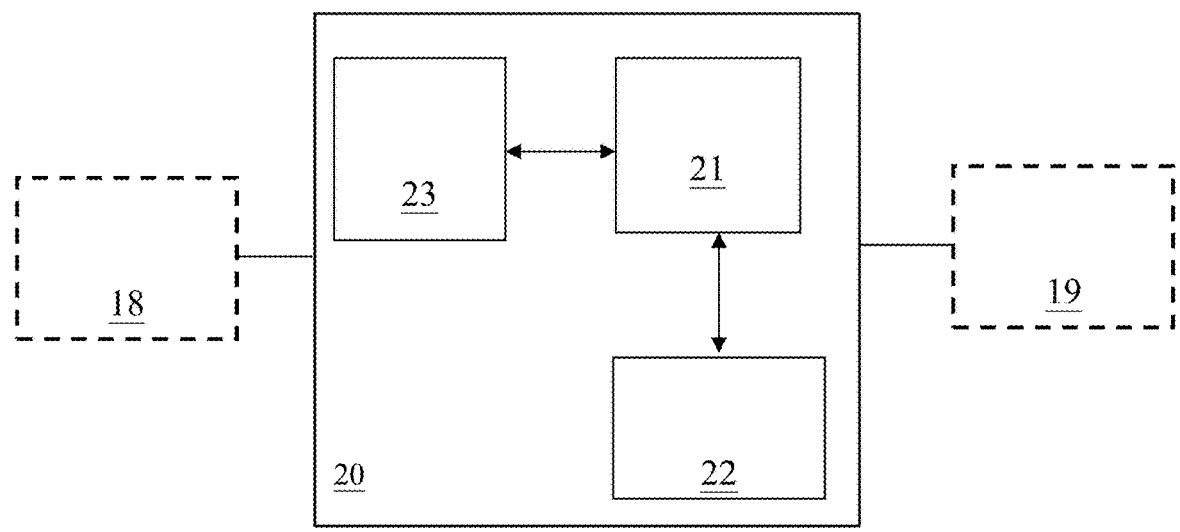
FIG. 3 is a block diagram of the multifunctional smart holder according to an embodiment of the present invention.
Figure 12:
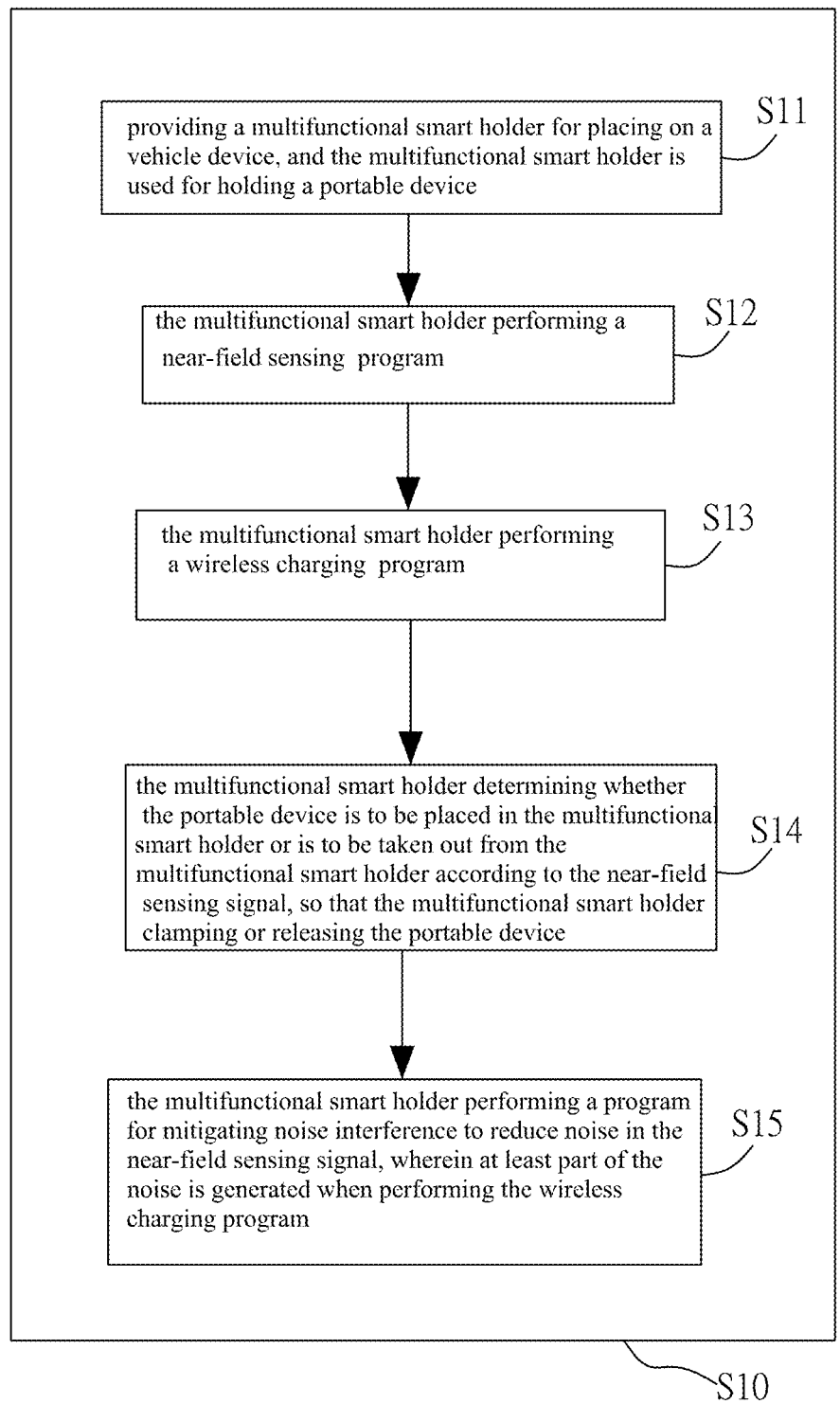
FIG. 12 is a flow chart of the steps of a control method of the multifunctional smart holder according to an embodiment of the present invention.

Please refer to FIG. 3 and compare with FIG. 12. FIG. 3 is a block diagram of the multifunctional smart holder 20 according to an embodiment of the present invention, and FIG. 12 is a flow chart of the steps of a control method S10 of the multifunctional smart holder according to an embodiment of the present invention. As shown in FIG. 3, the multifunctional smart holder 20 of the present embodiment can be placed on a vehicle device 19, and the multifunctional smart holder 20 of the present embodiment can be used to hold a portable device 18 (refer to step S11 shown in FIG. 12).

The multifunctional smart holder 20 of the present embodiment comprises: a near-field sensing circuit 23, a wireless charging circuit 22, and a control circuit 21. The near-field sensing circuit 23 is used for performing a near-field sensing program (refer to step S12 shown in FIG. 12) to sense a near-field distance between an object to be tested and the multifunction smart holder 20 to generate a near-field sensing signal. The wireless charging circuit 22 is used for performing a wireless charging program (refer to step S13 shown in FIG. 12).

The control circuit 21 is used for determining whether the portable device 18 is to be placed in the multifunctional smart holder 20 or to be taken out from the multifunctional smart holder 20 according to the near-field sensing signal, so that the multifunctional smart holder 20 clamps or releases the portable device 18 (refer to step S14 shown in FIG. 12). Wherein the control circuit 21 performs a program for mitigating noise interference to reduce noise in the near-field sensing signal, wherein at least part of the noise is generated when the wireless charging circuit 22 performs the wireless charging program.

In this embodiment, the portable device 18 can be, for example but not limited to, a smart phone, a mobile Internet device (MID), a smart tablet, a transformable tablet, a notebook computer, a mobile phone, a watch, a laptop computer, an Ultrabook™ computer, a PDA device, a hand-held PDA device, or any other type of portable device.

Figure 4A:
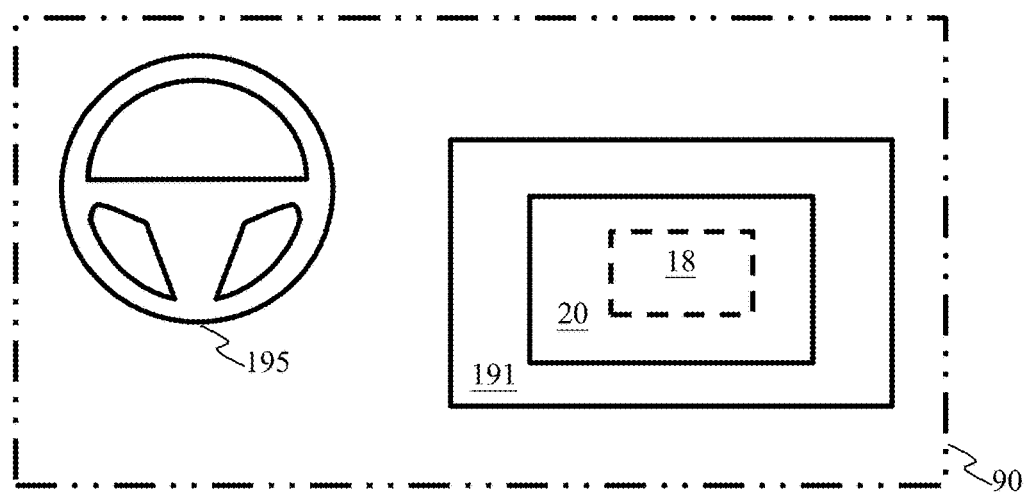
FIG. 4A is a schematic diagram of the multifunctional smart holder being placed in a vehicle device according to an embodiment of the present invention, wherein the multifunctional smart holder is used to hold a portable device.
Figure 4B:
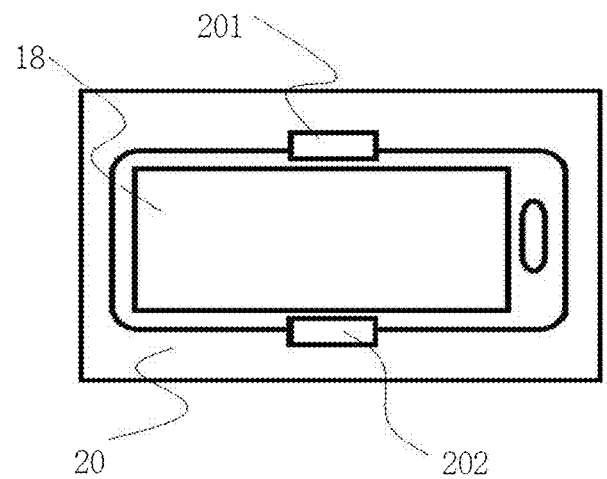
FIG. 4B is a schematic diagram of the multifunctional smart holder for holding a portable device according to an embodiment of the present invention.

Please refer to FIGS. 4A and 4B. FIG. 4A is a schematic diagram of the multifunctional smart holder 20 being placed in a vehicle device according to an embodiment of the present invention, wherein the multifunctional smart holder 20 is used for holding the portable device 18. FIG. 4B is a schematic diagram of the multifunctional smart holder 20 for holding the portable device 18 according to an embodiment of the present invention.

As shown in FIG. 4A, in the present embodiment, the vehicle device 19 can be, for example but not limited to, the console 191 in the vehicle body 90 that is located on the right side (or left side) of the steering wheel 195 in the vehicle body 90. In such an embodiment, as shown in FIG. 4A, the multifunctional smart holder 20 of the present embodiment is placed in the console 191 in the vehicle body 90, and the multifunctional smart holder 20 in the console 191 in the vehicle body 90 is used for holding the portable device 18.

As shown in FIG. 4B, in the present embodiment, the multifunctional smart holder 20 can include two clamping arms, that are, a clamping arm 201 and a clamping arm 202. With the clamping arm 201 and the clamping arm 202, the multifunctional smart holder 20 can be used for holding the portable device 18 (features and details of how the multifunctional smart holder 20 holds or releases the portable device 18 with the clamping arm 201 and the clamping arm 202 will be described later).

Of course, in the present invention, the vehicle device 19 is not limited to the console 191 in the vehicle body 90, and can be other parts in the vehicle body 90.

Figure 5:
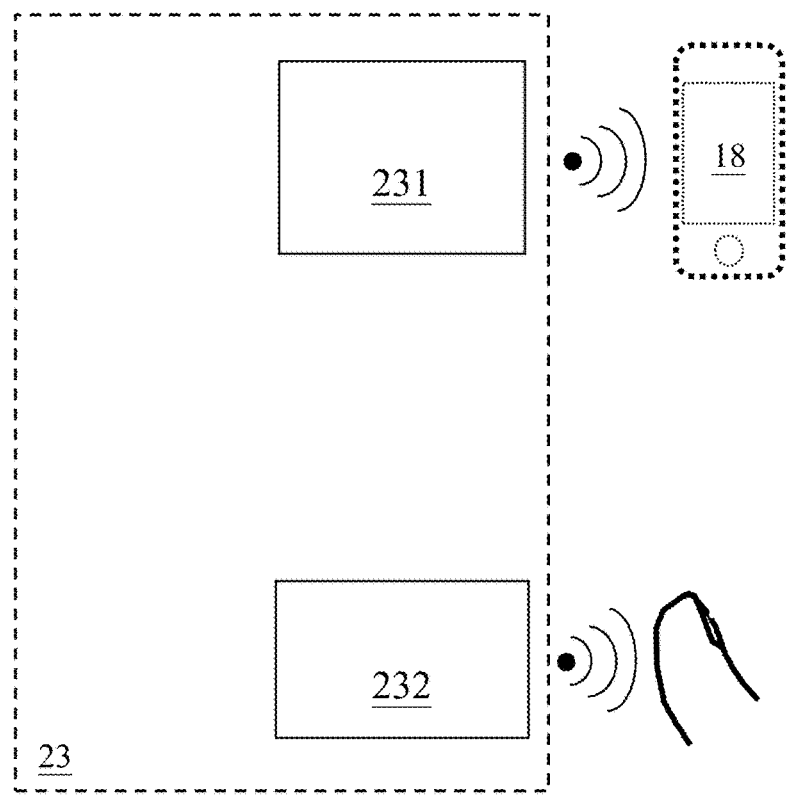
FIG. 5 is a schematic diagram of a near-field sensing circuit in the multifunction smart holder according to an embodiment of the present invention.

Please refer to FIG. 5, which is a schematic diagram of a near-field sensing circuit 23 in the multifunction smart holder 20 according to an embodiment of the present invention. As shown in the figure, the near-field sensing circuit 23 comprises a placement sensor 231 and a take-out sensor 232. The object to be tested comprises the portable device 18, and the near-field sensing program comprises a placement sensing program to sense a device distance between the portable device 18 and the multifunctional smart holder 20 to generate a device sensing signal in the near-field sensing signal, so that the control circuit 21 determines that the portable device 18 is to be placed in the multifunctional smart holder 20, and causes the multifunctional smart holder 20 to clamp the portable device 18.

Referring to FIG. 5, in the multifunctional smart holder 20 of the present invention, the near-field sensing circuit 23 further comprises the take-out sensor 232, and the object to be tested further comprises a human body part, such as but not limited to, a finger shown in the figure. The near-field sensing program further comprises a take-out sensing program to sense a human body distance between the human body part and the multifunctional smart holder 20 to generate a human body sensing signal in the near-field sensing signal, so that the control circuit 21 determines that the portable device 18 is to be taken out from the multifunctional smart holder 20, and causes the multifunctional smart holder 20 to release the portable device 18.

Figure 6:
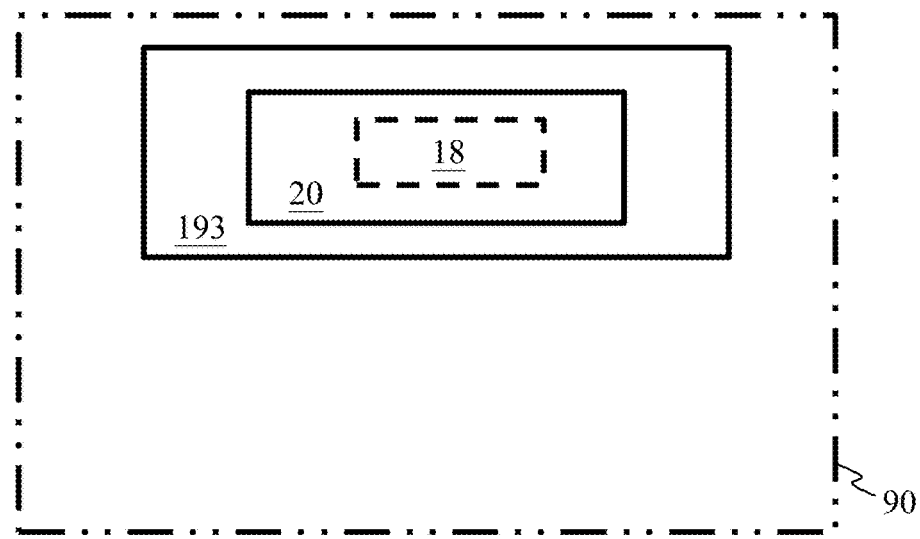
FIG. 6 is a schematic diagram of the multifunctional smart holder being placed on a vehicle device according to another embodiment of the present invention, wherein the multifunctional smart holder is used to hold a portable device.

Please refer to FIG. 6, which is a schematic diagram of the multifunctional smart holder 20 being placed on a vehicle device according to another embodiment of the present invention, wherein the multifunctional smart holder 20 is used to hold the portable device 18.

As shown in FIG. 6, in the present embodiment, the vehicle device 19 can be, for example but not limited to, the rear view mirror 193 in the vehicle body 90. In such an embodiment, as shown in FIG. 5, the multifunctional smart holder 20 of the present embodiment is placed on the rear view mirror 193 in the vehicle body 90, and the multifunctional smart holder 20 on the rear view mirror 193 in the vehicle body 90 is used to hold the portable device 18.

Of course, in the present invention, the vehicle device 19 is not limited to the console 191 or the rear view mirror 193 in the vehicle body 90. In other embodiments, the vehicle device 19 can also be any other part in the vehicle body 90.

The advantages and features of the present invention over the prior art are that the program for mitigating noise interference can be performed by the control circuit 21 of the multifunctional smart holder 20 of the embodiment shown in FIG. 3, thereby reducing the interference on the near-field sensing program performed by the near-field sensing circuit 23 caused by noise generated by the wireless charging circuit 22 performing the wireless charging program, in order to prevent misjudgment of the near-field sensing program.

The following will be explained by using FIG. 7, when the present invention performs the program for mitigating noise interference (refer to step S15 shown in FIG. 13), it can be implemented by the control circuit 21 of the multifunctional smart holder 20 of the embodiment shown in FIG. 3.

Figure 7:
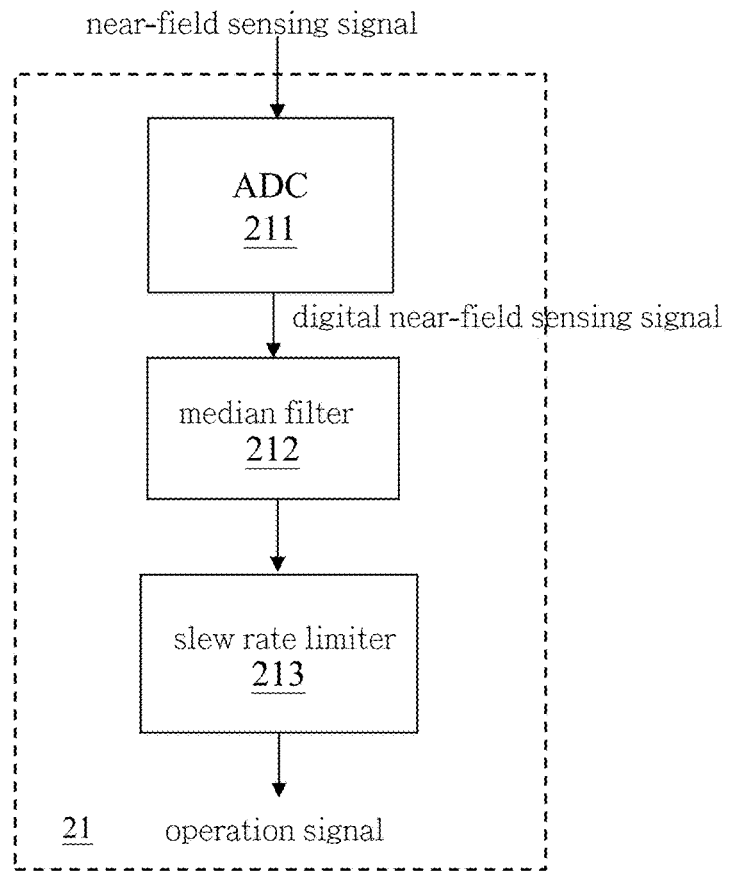
FIG. 7 is a block diagram of a control circuit of the multifunctional smart holder for performing a program for mitigating noise interference according to an embodiment of the present invention.

Please refer to FIG. 7, which is a block diagram of the control circuit 21 of the multifunctional smart holder 20 for performing the program for mitigating noise interference according to an embodiment of the present invention.

Figure 13:
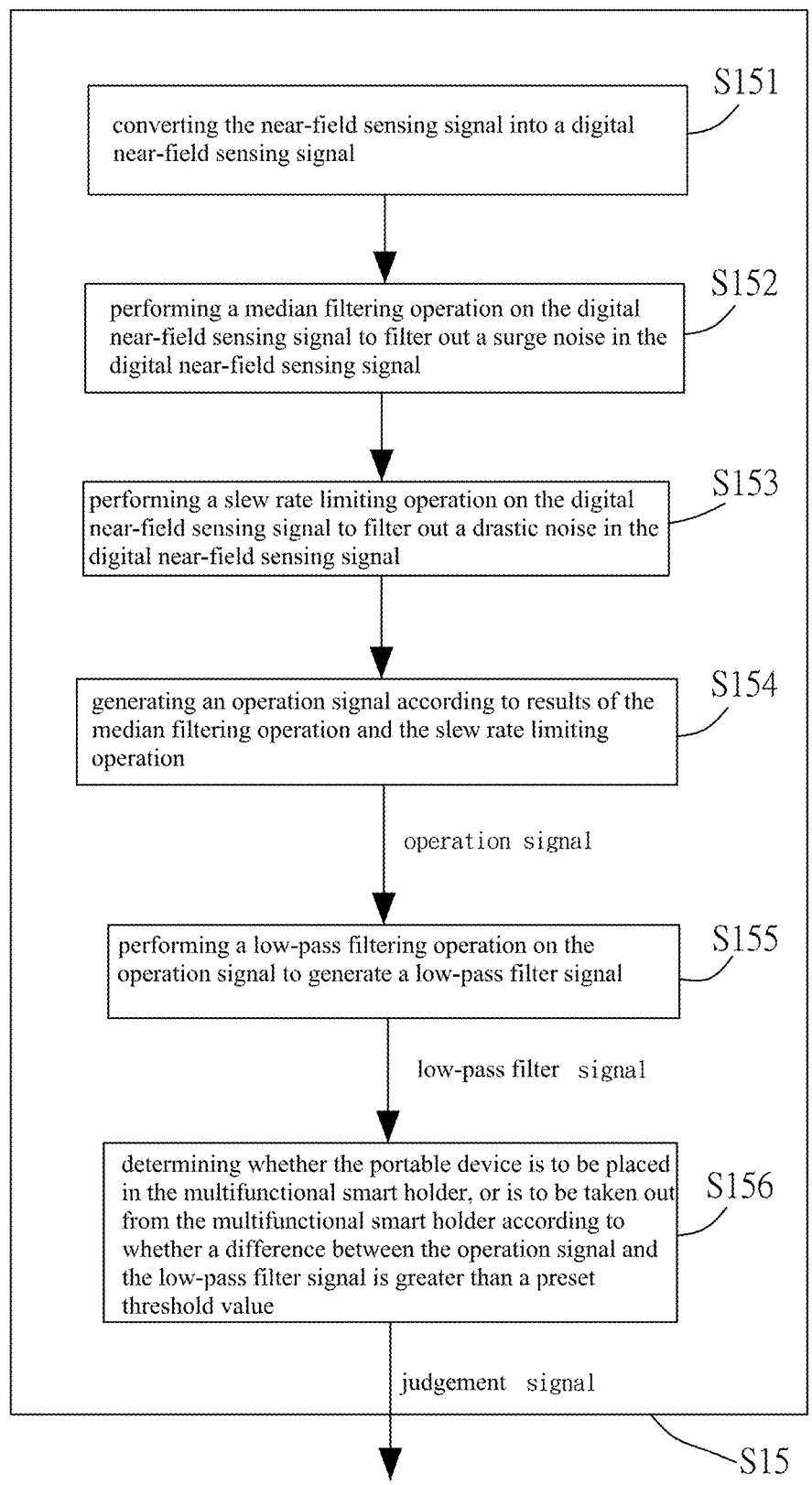
FIG. 13 is a flow chart of the steps of the program for mitigating noise interference of the control method of the multifunctional smart holder according to an embodiment of the present invention.

Please refer to FIGS. 7 and 13 for an embodiment. FIG. 13 is a flow chart of the steps of the program for mitigating noise interference of the control method of the multifunctional smart holder 20 according to an embodiment of the present invention.

In order to perform the program for mitigating noise interference by the control circuit 21 of the multifunctional smart holder 20 of the embodiment shown in FIG. 7 (refer to step S15 shown in FIG. 13), as shown in FIG. 7, the control circuit 21 of the multifunctional smart holder 20 can comprise an analog-to-digital converter (ADC) 211, a median filter 212, and a slew rate limiter 213.

As shown in FIG. 7, in the present embodiment, the analog-to-digital converter 211 is used to read the near-field sensing signal to convert the near-field sensing signal into a digital near-field sensing signal (refer to step S151 shown in FIG. 13). The median filter 212 is coupled to the analog-to-digital converter 211 for performing a median filtering operation on the digital near-field sensing signal to filter out a surge noise in the digital near-field sensing signal (refer to step S152 shown in FIG. 13). The slew rate limiter 213 is coupled to the analog-to-digital converter 211 for performing a slew rate limiting operation on the digital near-field sensing signal to filter out a drastic noise in the digital near-field sensing signal (refer to step S153 shown in FIG. 13). Wherein the control circuit 21 generates an operation signal according to results of the median filtering operation and the slew rate limiting operation, and the program for mitigating noise interference comprises the median filtering operation and the slew rate limiting operation. Wherein the so-called median filtering operation refers to selecting the median of the digital near-field sensing signal in each preset time interval; and the slew rate limiting operation refers to filtering out a portion of the slew rate beyond a preset slew rate in the signal oscillogram of the digital near-field sensing signal versus time. The median filtering operation and the slew rate limiting operation are well known to those of ordinary skill in the art, and will not be further described herein.

Figure 8:
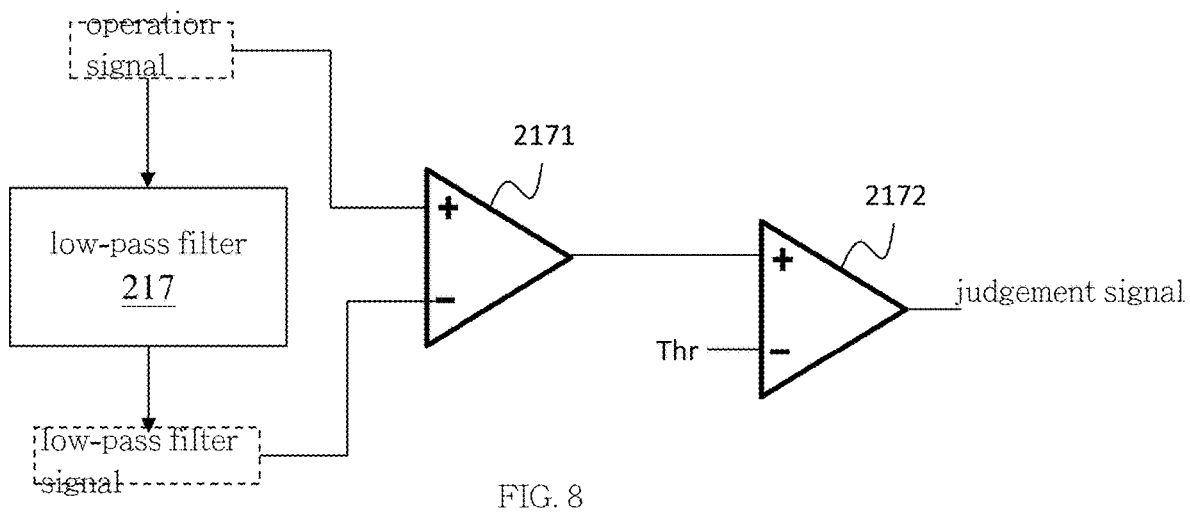
FIG. 8 is a schematic diagram of the control circuit of the multifunctional smart holder including a low-pass filter according to an embodiment of the present invention.

Please refer to FIG. 8 and compare with FIG. 13 for another embodiment. In order to perform the program for mitigating noise interference by the multifunctional smart holder 20 of the embodiment shown in FIG. 8 (refer to step S15 shown in FIG. 13), as shown in FIG. 8, the control circuit 21 of the multifunctional smart holder 20 can further comprise a low-pass filter 217 for performing a low-pass filtering operation on the operation signal to generate a low-pass filter signal; wherein the control circuit 21, according to whether a difference between the operation signal and the low-pass filter signal is greater than a preset threshold value Thr, determines whether the portable device 18 is to be placed in the multifunctional smart holder 20, or is to be taken out from the multifunctional smart holder 20; wherein the program for mitigating noise interference further comprises the low-pass filtering operation.

That is, an environmental reference value (i.e. a low-pass filter signal) is obtained by performing low-pass filtering of the operation signal. There are various ways to perform the low-pass filtering operation, mainly related to the operation signal generated by the near-field sensing signal, taking into account environmental changes, that is, the environmental reference value, such as changes in the level of the operation signal caused by the wireless charging program; or noise interference of other various ambient noises of approach sensing such as temperature, humidity, electromagnetic waves, etc. The low-pass filter signal obtained from the operation signal can be used as a background value when performing the approach sensing program. As shown in FIG. 8, the low-pass filter signal of the operation signal is obtained by low-pass filtering, and then the operation signal and the low-pass filter signal are input into a comparator 2171 for comparing, and then an output signal of the comparator 2171, that is a difference between the operation signal and the low-pass filter signal, is input into a comparator 2172, and the comparator 2172 compares the difference with the preset threshold value Thr. For example, when the difference is greater than the preset threshold value Thr, a judgement signal represents that the portable device 18 is to be placed in the multifunctional smart holder 20.

There are many ways of implementation of the low-pass filtering operation. For example, in one embodiment, the low-pass filtering operation can include a moving average operation. Wherein the low-pass filter 217 performs the moving average operation on the operation signal to achieve low-pass filtering of the operation signal to generate the low-pass filter signal. The calculation formula of the moving average operation method can be, for example but not limited to be, expressed by the following relational formula:

$$Ft=(At\text{-}1+At\text{-}2+At\text{-}3+ \ldots +At\text{-}n)/n$$

Wherein, Ft represents the time point t, the moving average value of the operation signal; n represents the number of periods of the moving average; At-1 represents the actual value of the operation signal of the previous period; At-2, At-3 and At-n respectively represent the actual value of the operation signal of the previous two periods, the previous three periods, and until the previous n periods.

Figure 14:
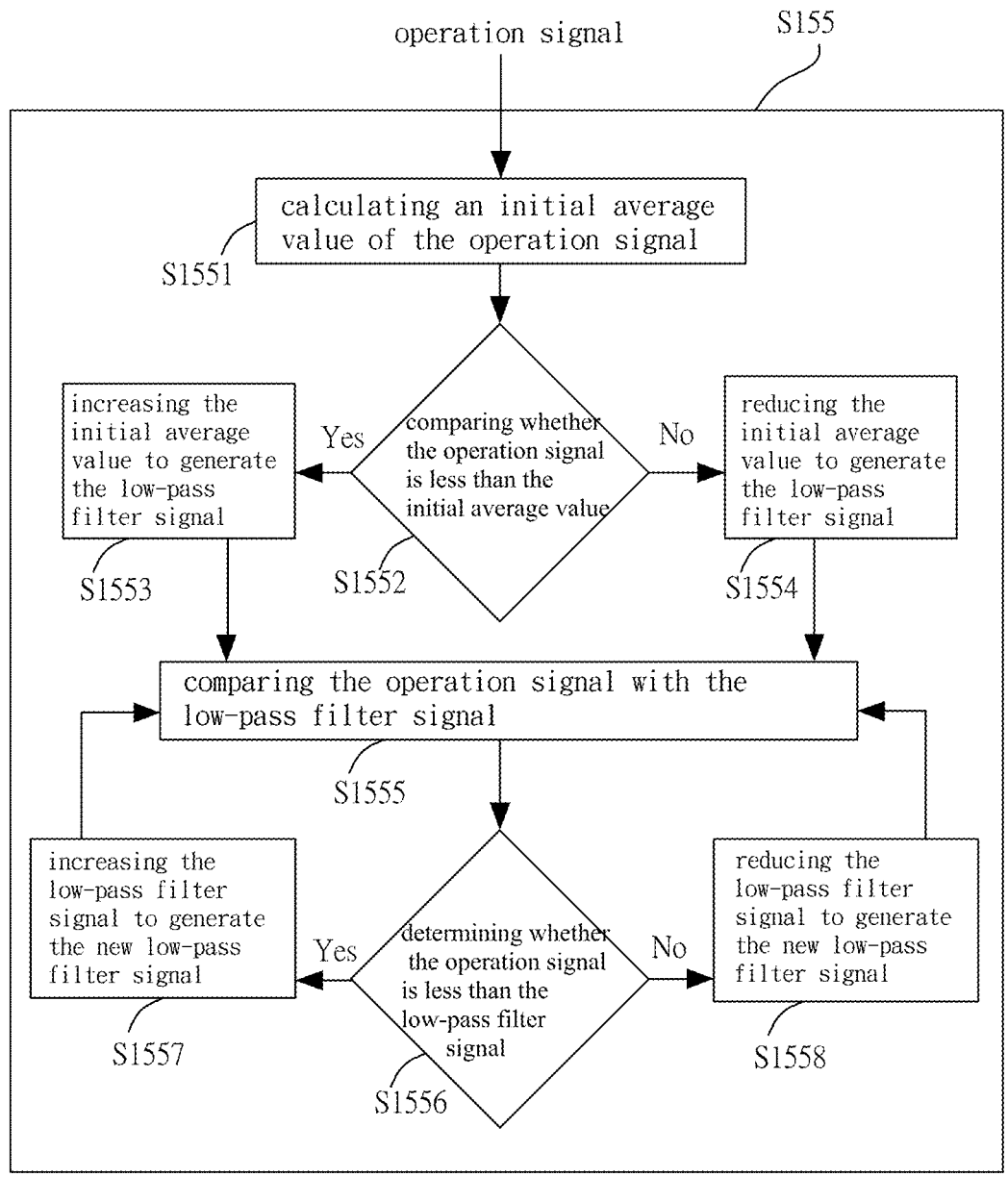
FIG. 14 is a flow chart of the steps of a self-learning procedure according to an embodiment of the present invention.

In another embodiment, the low-pass filtering operation comprises a self-learning procedure in which the low-pass filter 217 performs the self-learning procedure on the operation signal to achieve low-pass filtering of the operation signal to generate the low-pass filter signal. Please refer to FIG. 14 for an example of how the self-learning procedure is implemented. The self-learning procedure, for example, comprises:

(A) calculating an initial average value of the operation signal (refer to step S1551 shown in FIG. 14);

(B) comparing the operation signal with the initial average value (refer to step S1552 shown in FIG. 14);

(C) when the operation signal is not less than the initial average value, increasing the initial average value to generate the low-pass filter signal (refer to step S1553 shown in FIG. 14);

(D) when the operation signal is less than the initial average value, reducing the initial average value to generate the low-pass filter signal (refer to step S1554 shown in FIG. 14);

(E) comparing the operation signal with the low-pass filter signal (refer to step S1555 shown in FIG. 14);

(F) checking the comparison result (refer to step S1556 shown in FIG. 14);

(G) when the operation signal is not less than the low-pass filter signal, increasing the low-pass filter signal to generate the new low-pass filter signal (refer to step S1557 shown in FIG. 14);

(H) when the operation signal is less than the low-pass filter signal, reducing the low-pass filter signal to generate the new low-pass filter signal (refer to step S1558 shown in FIG. 14); and (I) repeating the step (E).

Figure 9:
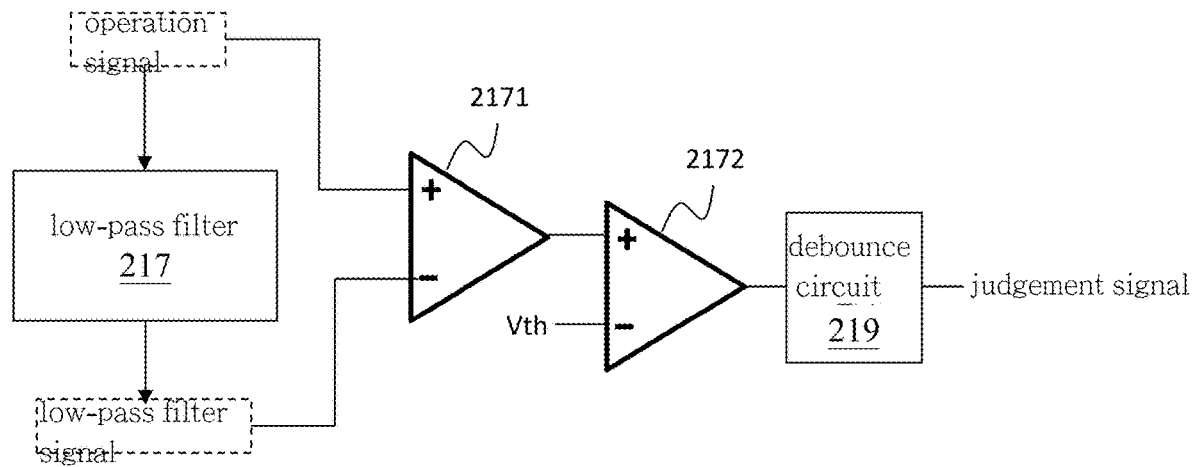
FIGS. 9 and 10 are schematic diagrams of the multifunctional smart holder further including a debounce circuit according to an embodiment of the present invention.
Figure 10:
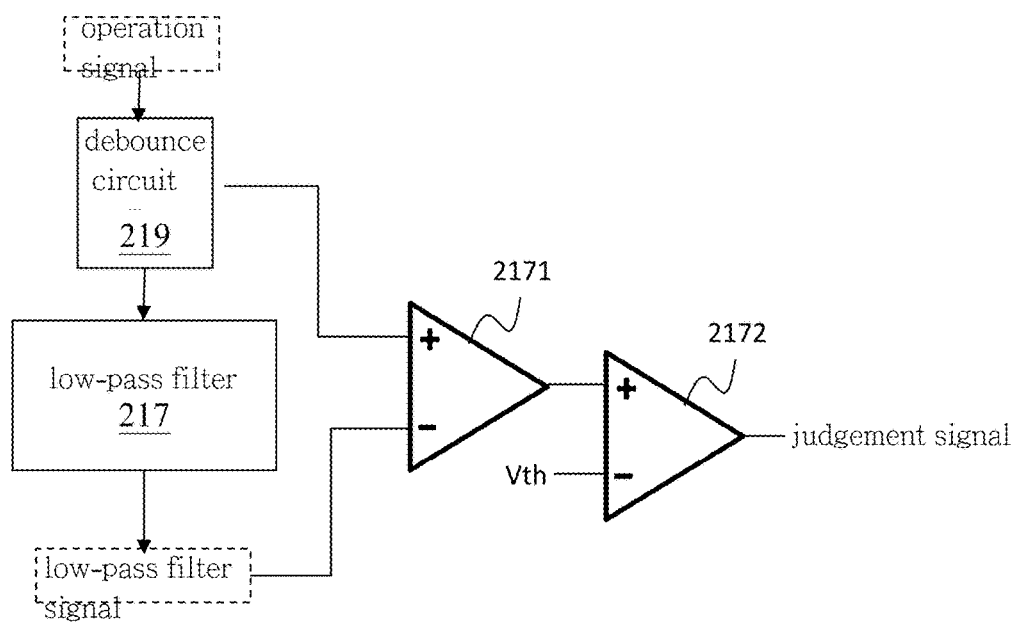
Figure 15:
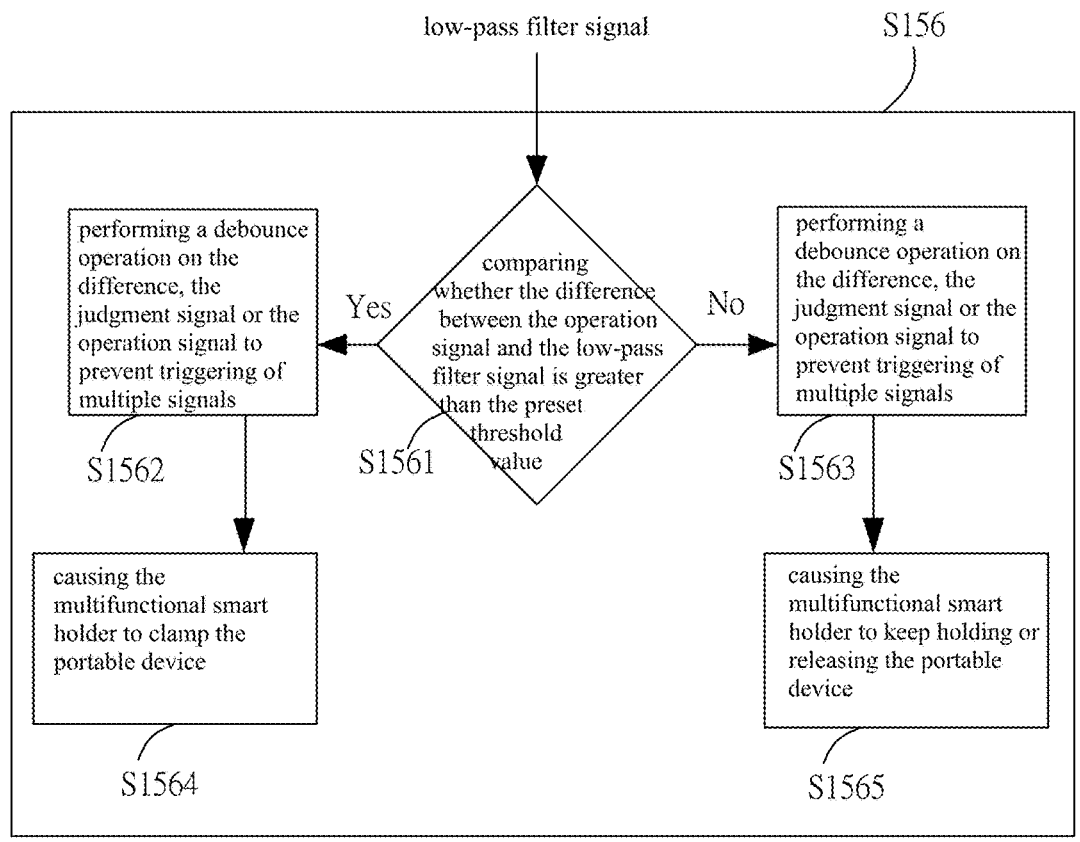
FIG. 15 is a flow chart of the steps of a debounce operation in the program for mitigating noise interference in the control method of the multifunctional smart holder according to an embodiment of the present invention.

Please refer to FIGS. 9 and 10 and compare with FIG. 15. FIGS. 9 and 10 illustrate that the multifunctional smart holder 20 of the present invention can further include a debounce circuit 219 for performing the steps of a debounce operation in the program for mitigating noise interference in the control method of the multifunctional smart holder 20 in the flow chart in FIG. 15.

In this embodiment, the control circuit 21 of the multifunctional smart holder 20 further comprises the debounce circuit 219 for performing the debounce operation on the judgement signal and the operation signal to prevent multiple signals in the near-field sensing signal from triggering noise; wherein the program for mitigating noise interference further comprises the debounce operation. Of course, the debounce circuit 219 can also perform the debounce operation on the difference output by the comparator 2171 to prevent the multiple signals in the near-field sensing signal from triggering noise.

Please refer to FIG. 15, first comparing whether the difference between the operation signal and the low-pass filter signal is greater than the preset threshold value Thr (refer to step S1561 shown in FIG. 15). When the difference between the operation signal and the low-pass filter signal is greater than the preset threshold value Thr, performing the debounce operation on the difference, the judgment signal or the operation signal to prevent triggering of the multiple signals (refer to step S1562 shown in FIG. 15); then causing the multifunctional smart holder 20 to clamp the portable device 18 (refer to step S1564 shown in FIG. 15). When the difference between the operation signal and the low-pass filter signal is not greater than the preset threshold value Thr, perform the debounce operation on the difference, the judgment signal or the operation signal to prevent triggering of the multiple signals (refer to step S1563 shown in FIG. 15); then cause the multifunctional smart holder 20 to keep holding or releasing the portable device 18 (refer to step S1565 shown in FIG. 15). Among them, the detailed features of the debounce operation (refer to steps S1564 and S1565 shown in FIG. 15) are well known to those skilled in the art, and the details thereof will not be described herein.

Figure 21A:
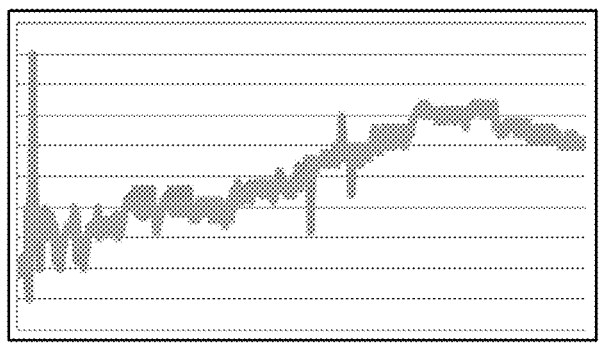
FIG. 21A is a signal oscillogram before a slew rate limiting operation has been performed.
Figure 21B:
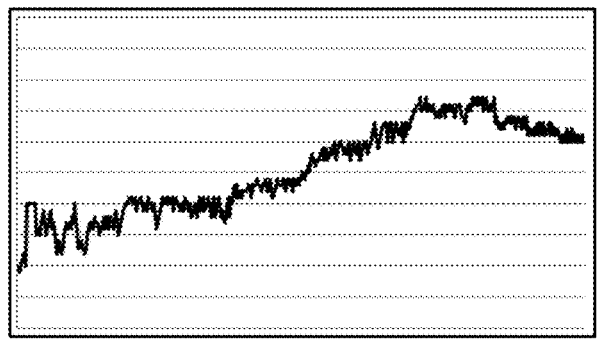
FIG. 21B is a signal oscillogram after a slew rate limiting operation has been performed.
Figure 21C:
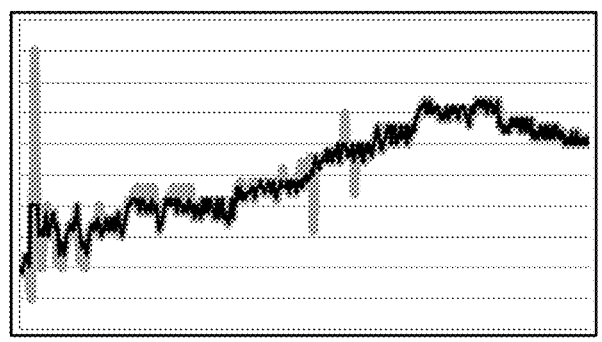
FIG. 21C shows a comparison relationship between the signal oscillograms of FIG. 21A and FIG. 21B.

Please refer to FIG. 21A to FIG. 21C at the same time. FIG. 21A is a signal oscillogram before the slew rate limiting operation has been performed; FIG. 21B is a signal oscillogram after the slew rate limiting operation has been performed; and FIG. 21C shows a comparison relationship between the signal oscillograms of FIG. 21A and FIG. 21B.

As shown in FIG. 21A, if the digital near-field sensing signal has not been subjected to the slew rate limiting operation, the signal oscillogram of the digital near-field sensing signal has a lot of noise.

However, as shown in FIG. 21B, if the digital near-field sensing signal has been subjected to the slew rate limiting operation, it can be seen that the noise has been distinctly removed according to the signal oscillogram of the digital near-field sensing signal. Referring to FIG. 21C, it can be seen that the noise has been distinctly removed after the digital near-field sensing signal has been subjected to the slew rate limiting operation.

Figure 22A:
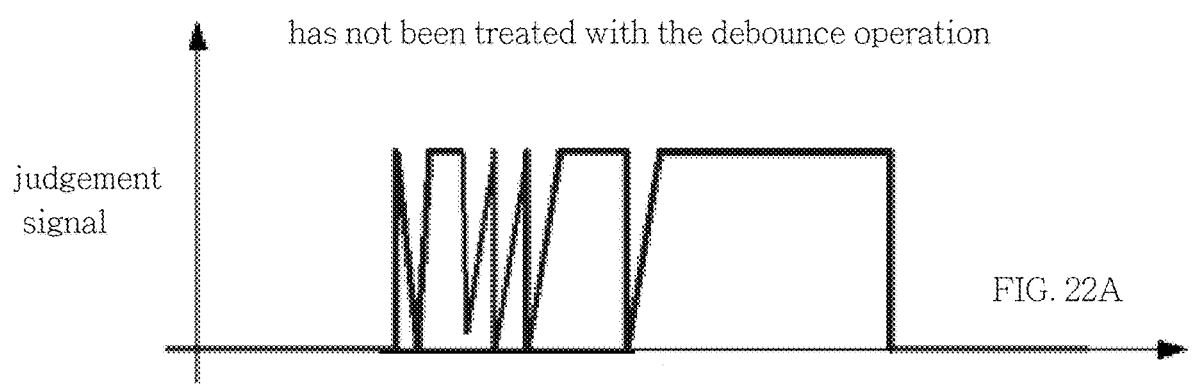
FIG. 22A is a signal oscillogram before a debounce operation has been performed.
Figure 22B:
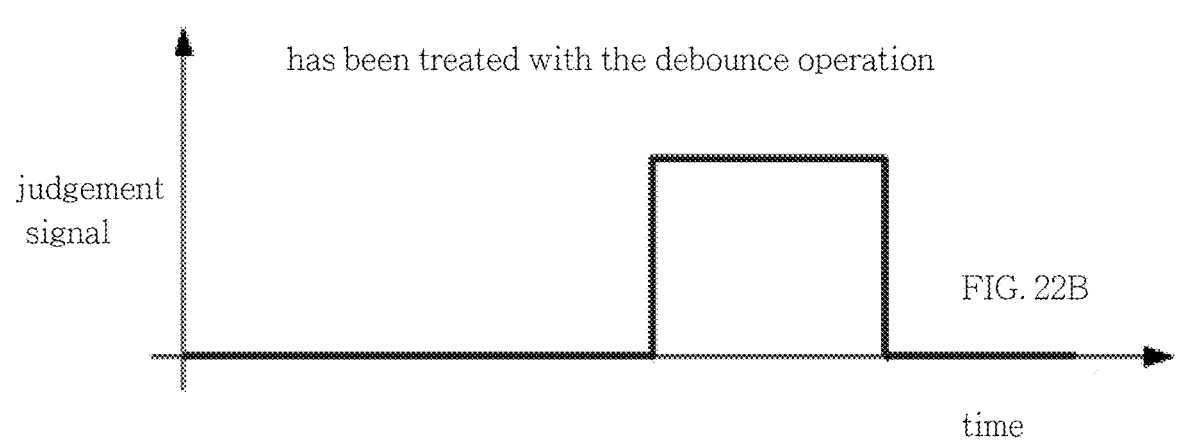
FIG. 22B is a signal oscillogram after a debounce operation has been performed.

Please refer to FIGS. 22A and 22B at the same time. FIG. 22A is a signal oscillogram before the debounce operation has been performed; and FIG. 22B is a signal oscillogram after the debounce operation has been performed.

As shown in FIG. 22A, if the debounce operation has not been performed, the signal oscillogram of the judgment signal will have the defect of triggering of multiple signals as shown in FIG. 22A.

However, as shown in FIG. 22B, if the debounce operation has been performed (that is, after steps S1564 and S1565 shown in FIG. 15 are performed), the signal oscillogram of the judgment signal is as shown in FIG. 22B, and this judgment signal no longer has any defect of triggering of multiple signals.

In one embodiment, in the multifunctional smart holder 20 of the embodiment shown in FIG. 3, the near-field sensing circuit 23 included therein can be used to cause the multifunctional smart holder 20 to clamp or release the portable device 18 by the determination of the judgement signal.

Figure 11:
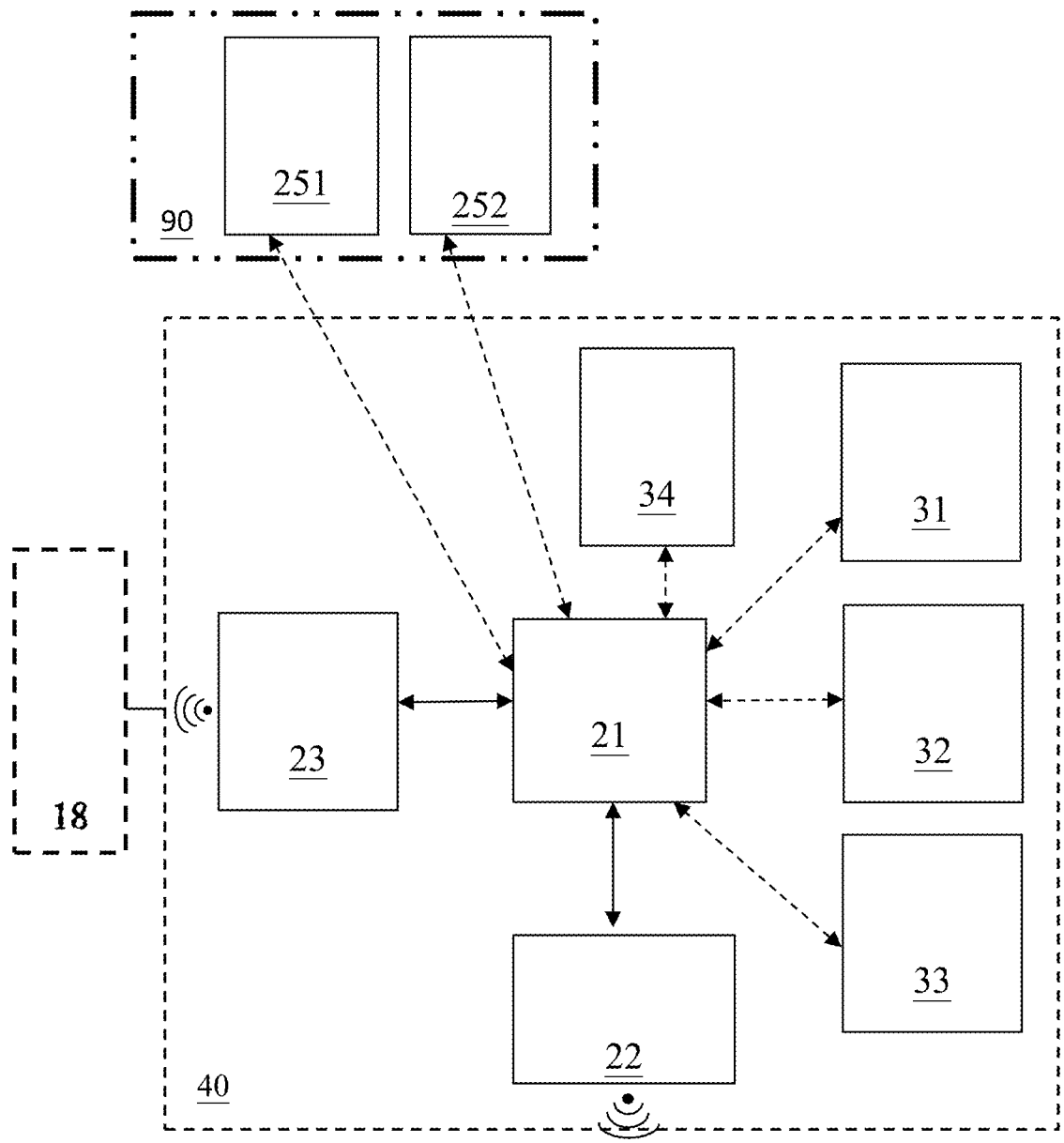
FIG. 11 is a block diagram of a multifunctional smart holder according to still another embodiment of the present invention.
Figure 16:
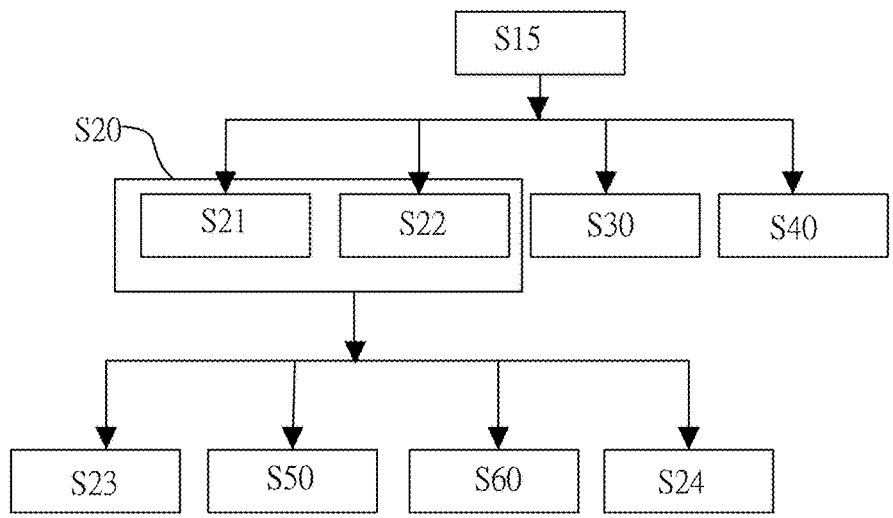
FIG. 16 is a flow chart of the steps of the control method of the multifunctional smart holder according to other various embodiments of the present invention.

Please refer to FIG. 11 and compare with FIG. 16. FIG. 11 is a block diagram of a multifunctional smart holder 40 according to still another embodiment of the present invention. FIG. 16 is a flow chart of the steps of the control method of the multifunctional smart holder 40 according to other various embodiments of the present invention.

As described above, when the present invention performs the program for mitigating noise interference (refer to step S15 shown in FIG. 13), it can be implemented by the control circuit 21 of the multifunctional smart holder 20 of the embodiment shown in FIG. 3.

Under the premise of performing the program for mitigating noise interference, in addition to the near-field sensing circuit 23 (refer to steps S21, S22, S23, and S24 shown in FIG. 16), the wireless charging circuit 22 (refer to step S60 shown in FIG. 16) and the control circuit 21 (refer to step S15 shown in FIG. 16), the multifunctional smart holder 40 of the present embodiment can further include: a driving motor 34 (refer to steps S21, S22, S23, and S24 shown in FIG. 16), a vibration sensor 31 (refer to step S30 shown in FIG. 16), a gravity sensor (G-sensor) 32 (refer to step S40 shown in FIG. 16) and/or a Bluetooth device 33 (refer to step S50 shown in FIG. 16).

Figure 17:
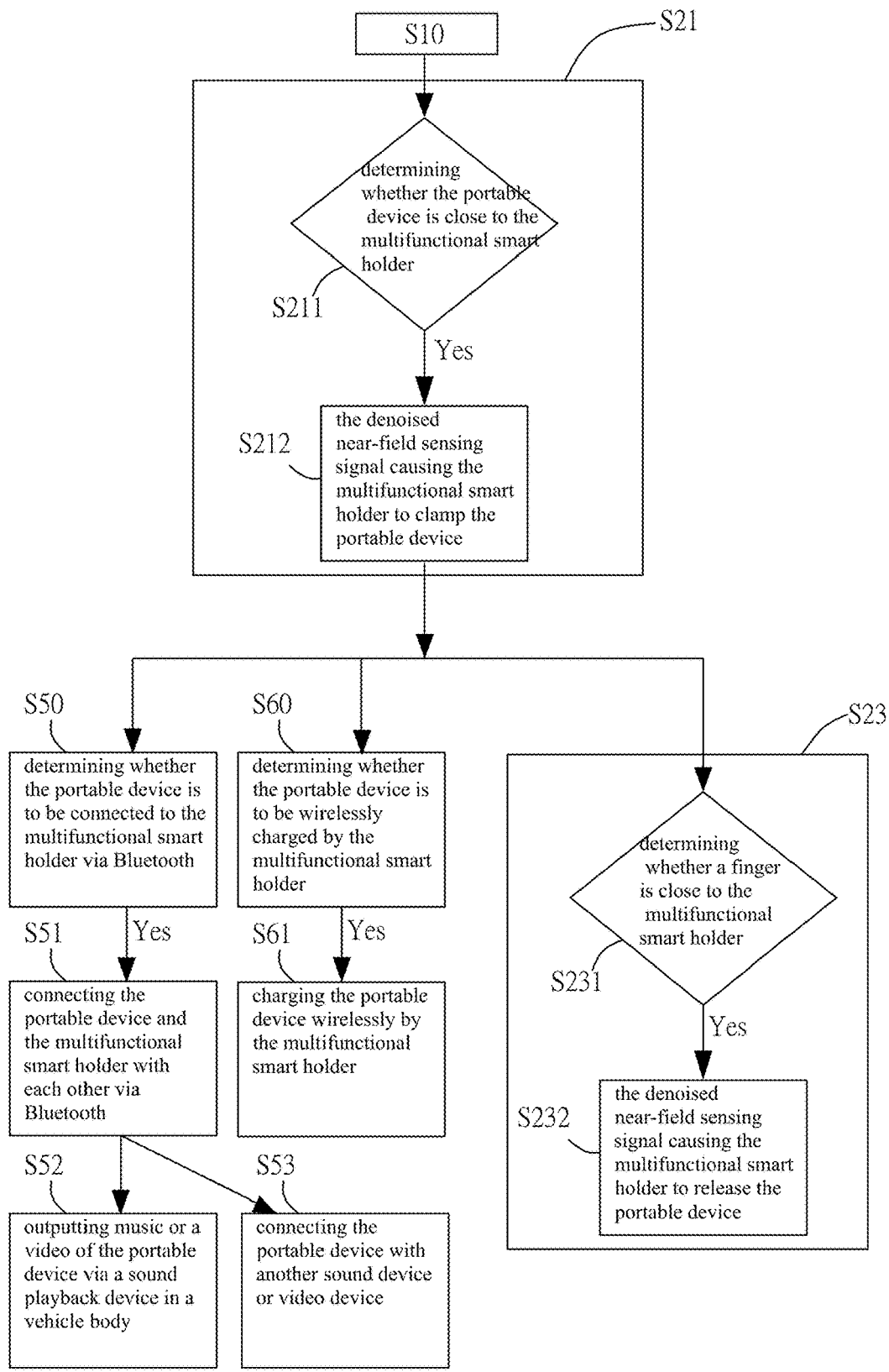
FIG. 17 is a flow chart of the steps of the control method of the multifunctional smart holder according to a specific embodiment of the present invention.
Figure 18:
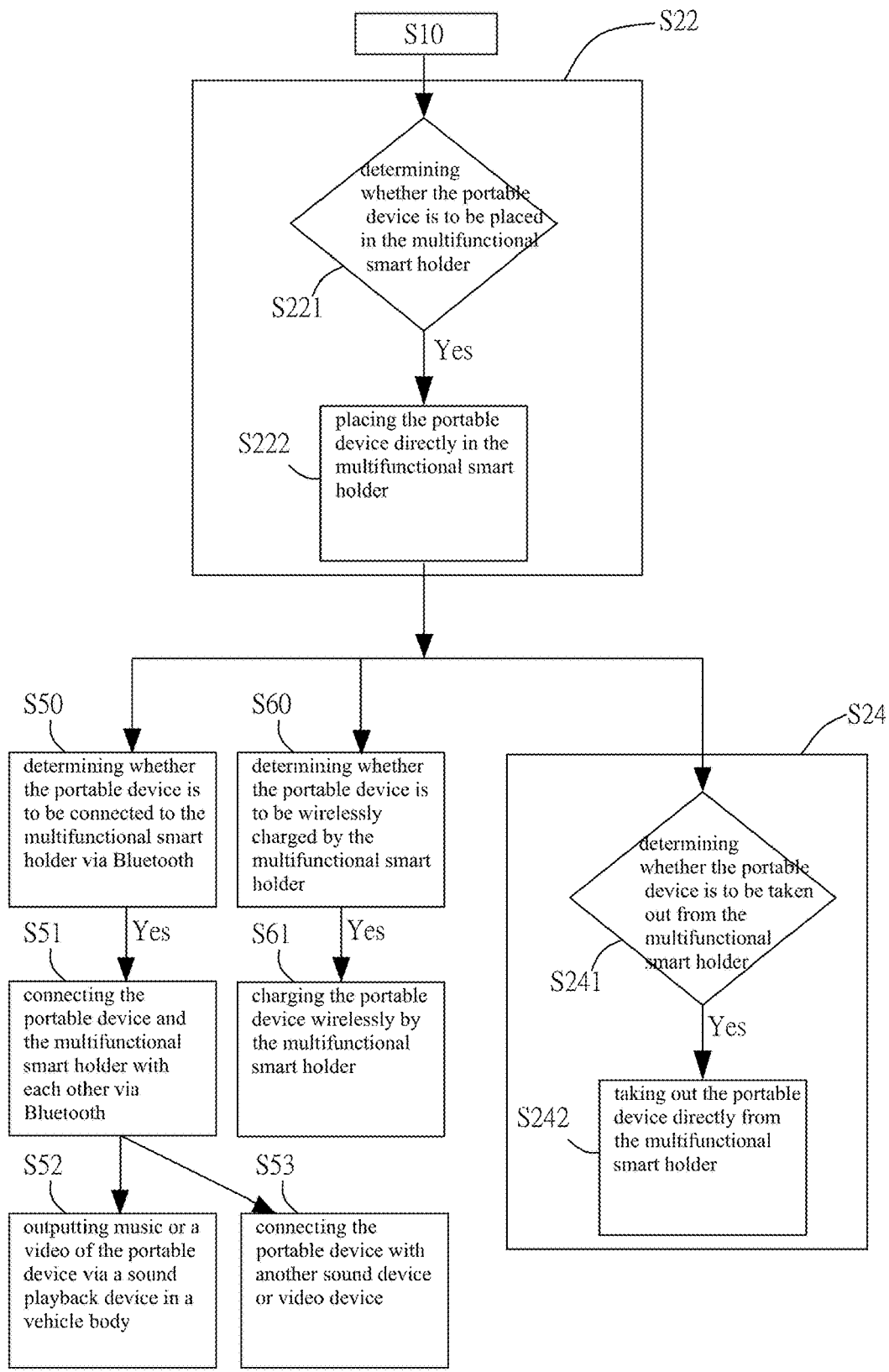
FIG. 18 is a flow chart of the steps of the control method of the multifunctional smart holder according to still another specific embodiment of the present invention.

Please refer to FIGS. 17 and 18 and compare with FIG. 11. FIG. 17 is a flow chart of the steps of the control method of the multifunctional smart holder according to a specific embodiment of the present invention. FIG. 18 is a flow chart of the steps of the control method of the multifunctional smart holder according to still another specific embodiment of the present invention.

In one embodiment, under the premise of performing the program for mitigating noise interference (refer to step S10 shown in FIGS. 17 and 18), the near-field sensing circuit 23 included in the multifunctional smart holder 40 of the present embodiment can be used to cause the multifunctional smart holder 40 to clamp or release the portable device 18 by the determination of the judgement signal (refer to steps S21 and S23 shown in FIG. 16).

The driving motor 34 included in the multifunctional smart holder 40 can be used to cause the multifunctional smart holder 40 to extend or contract the clamping arm 201 and the clamping arm 202 of the multifunctional smart holder 40 (refer to FIG. 4B).

When the portable device 18 is close to the multifunctional smart holder 40 (refer to step S211 shown in FIG. 17), it causes the judgement signal to determine that the multifunctional smart holder 40 needs to clamp the portable device 18, and the control circuit 21 notifies the driving motor 34 to contract the clamping arm 201 and the clamping arm 202 of the multifunctional smart holder 40 (refer to FIG. 4B) to cause the multifunctional smart holder 40 to clamp the portable device 18 (refer to step S212 shown in FIG. 16).

When a finger approaches the multifunctional smart holder 40 (refer to step S231 shown in FIG. 17), it causes the judgement signal to determine that the multifunctional smart holder 40 needs to release the portable device 18, and the control circuit 21 notifies the driving motor 34 to extend the clamping arm 201 and the clamping arm 202 of the multifunctional smart holder 40 to cause the multifunctional smart holder 40 to release the portable device 18.

In one embodiment, under the premise of performing the program for mitigating noise interference (refer to step S10 shown in FIGS. 17 and 18), the wireless charging circuit 22 included in the multifunctional smart holder 40 of the present embodiment can be used to charge the portable device 18 wirelessly by performing the wireless charging program. When it is determined that the portable device 18 is to be wirelessly charged by the multifunctional smart holder 40 (refer to step S60 shown in FIGS. 17 and 18), the wireless charging circuit 22 included in the multifunctional smart holder 40 can be used to charge the portable device 18 wirelessly by performing the wireless charging program (refer to step S61 shown in FIGS. 17 and 18).

In one embodiment, under the premise of performing the program for mitigating noise interference (refer to step S10 shown in FIGS. 17 and 18), the Bluetooth device 33 included in the multifunctional smart holder 40 of the present embodiment can be used to connect to the portable device 18 via Bluetooth.

When it is determined that the portable device 18 is to be connected to the multifunctional smart holder 40 via Bluetooth (refer to step S50 shown in FIGS. 17 and 18), the portable device 18 and the Bluetooth device 33 included in the multifunctional smart holder 40 are connected to each other via Bluetooth (refer to step S51 shown in FIGS. 17 and 18).

Thereby, when the portable device 18 plays music or a video stored in the portable device 18, the Bluetooth device 33 included in the multifunctional smart holder 40 notifies the control circuit 21, so that in one embodiment, the control circuit 21 notifies a sound playback device 252 in the vehicle body 90 to output the music or video of the portable device 18 (refer to step S52 shown in FIGS. 17 and 18). Alternatively, in another embodiment, the control circuit 21 notifies another sound device or video device of the vehicle body 90 to output the music or video of the portable device 18 (refer to step S53 shown in FIGS. 17 and 18).

Please refer to FIG. 11 and compare with FIG. 18.

In one embodiment, under the premise of performing the program for mitigating noise interference (refer to step S10 shown in FIG. 18), the multifunctional smart holder 40 of the present embodiment can directly determine whether the portable device 18 is to be directly placed in the multifunctional smart holder 40 (refer to step S221 shown in FIG. 18). When it is determined that the portable device 18 is to be directly placed in the multifunctional smart holder 40, the portable device 18 is directly placed in the multifunctional smart holder 40 (see step S222 shown in FIG. 18 and refer to FIG. 11).

Then the multifunctional smart holder 40 of the present embodiment can also directly determine that the portable device 18 is to be taken out from the multifunctional smart holder 40 (refer to step S241 shown in FIG. 18). When it is determined that the portable device 18 is to be taken out from the multifunctional smart holder 40, the portable device 18 is directly taken out from the multifunctional smart holder 40 (see step S242 shown in FIG. 18 and refer to FIG. 11).

Figure 19:
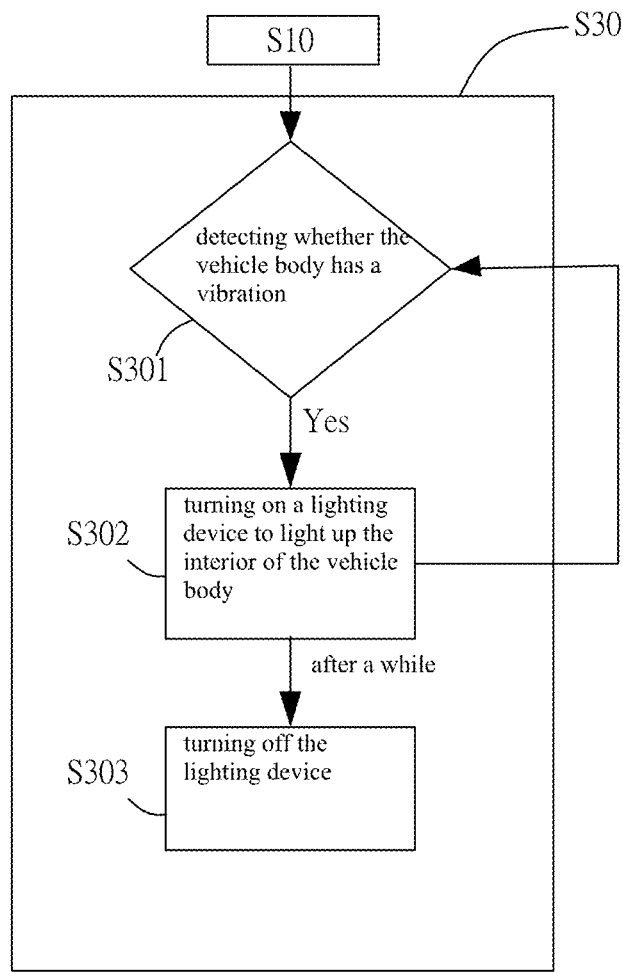
FIG. 19 is a flow chart of the steps of the control method of the multifunctional smart holder according to yet another specific embodiment of the present invention.

Please refer to FIG. 19 and compare with FIG. 11. FIG. 19 is a flow chart of the steps of the control method of the multifunctional smart holder according to yet another specific embodiment of the present invention.

In one embodiment, under the premise of performing the program for mitigating noise interference (refer to step S10 shown in FIG. 19), the vibration sensor 31 included in the multifunctional smart holder 40 of the present embodiment can be used to detect and determine whether the vehicle body 90 placed with the multifunctional smart holder 40 has a vibration (refer to step S301 shown in FIG. 19). When the vibration sensor 31 detects and determines that the vehicle body 90 placed with the multifunctional smart holder 40 has a vibration, the vibration sensor 31 notifies the control circuit 21 to turn on a lighting device 251 of the vehicle body 90 to light up the interior of the vehicle body 90 (refer to step S302 shown in FIG. 19), display the brand inside the vehicle body 90 or generate a warning function. After waiting for a while, the control circuit 21 can turn off the lighting device 251 of the vehicle body 90 (refer to step S303 shown in FIG. 19).

Figure 20:
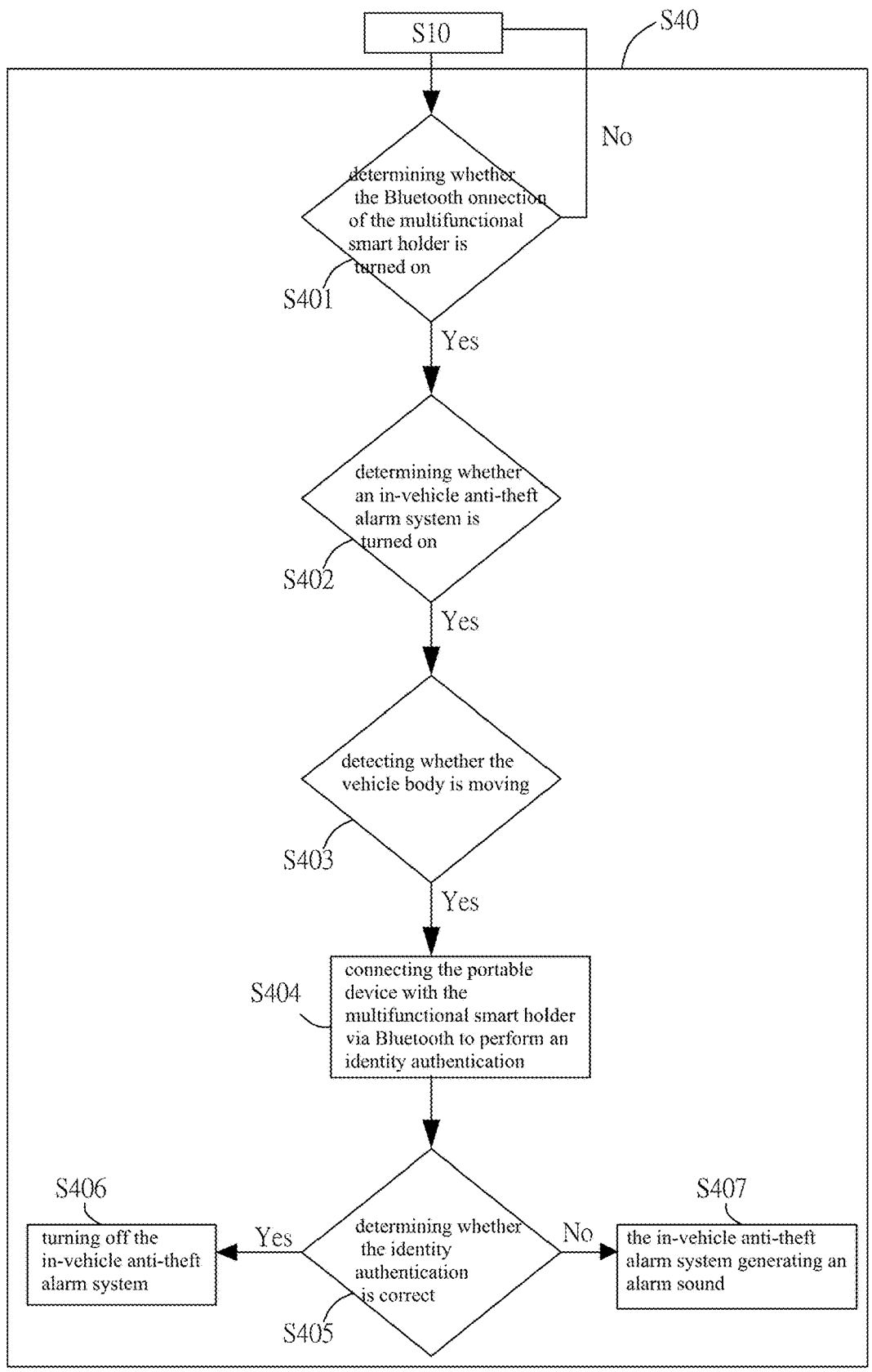
FIG. 20 is a flow chart of the steps of the control method of the multifunctional smart holder according to a further specific embodiment of the present invention.

Please refer to FIG. 20 and compare with FIG. 11. FIG. 20 is a flow chart of the steps of the control method of the multifunctional smart holder according to a further specific embodiment of the present invention.

In one embodiment, under the premise of performing the program for mitigating noise interference (refer to step S10 shown in FIG. 20), when an identity authentication program is required, the multifunctional smart holder 40 of the present embodiment first determines whether the Bluetooth connection function of the included Bluetooth device 33 is turned on (refer to step S401 shown in FIG. 20), when the multifunctional smart holder 40 determines that the Bluetooth connection function of the included Bluetooth device 33 is turned on, the Bluetooth device 33 notifies the control circuit 21 to cause the control circuit 21 to turn on an in-vehicle anti-theft alarm system of the vehicle body 90 (refer to step S402 shown in FIG. 20).

Then the gravity sensor (G-sensor) 32 included in the multifunctional smart holder 40 of this embodiment can be used to detect whether the vehicle body 90 placed with the multifunctional smart holder 40 is moving (refer to step S403 shown in FIG. 20), when the gravity sensor 32 detects that the vehicle body 90 is moving, the gravity sensor 32 notifies the control circuit 21 to turn on the in-vehicle anti-theft alarm system of the vehicle body 90, thereby enabling the portable device 18 and the multifunctional smart holder 40 to perform an identity authentication program by Bluetooth connection for anti-theft alarm (refer to step S404 shown in FIG. 20).

Then the multifunctional smart holder 40 determines whether the identity authentication is correct (refer to step S405 shown in FIG. 20).

When the multifunctional smart holder 40 determines that the identity authentication is correct, the control circuit 21 turns off the in-vehicle anti-theft alarm system (refer to step S406 shown in FIG. 20).

When the multifunctional smart holder 40 determines that the identity authentication is not correct, the control circuit 21 turns on the in-vehicle anti-theft alarm system to generate an alarm sound (refer to step S407 shown in FIG. 20) to deter the gangster.

Figure 23:
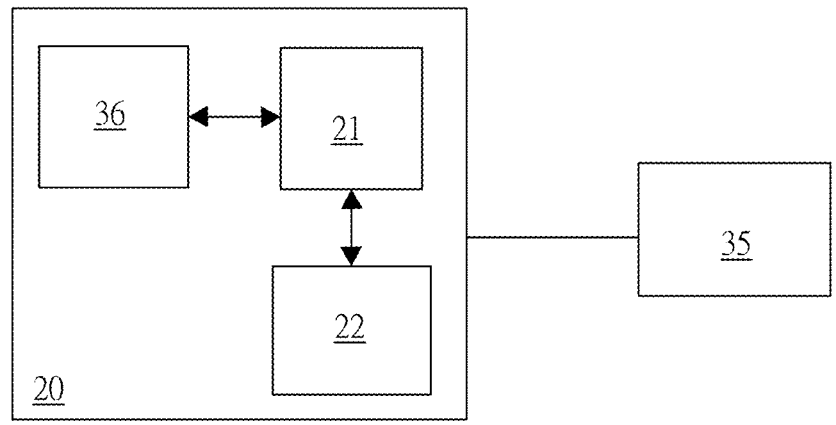
FIG. 23 is a block diagram of the multifunctional smart holder according to a further specific embodiment of the present invention.
Figure 24:
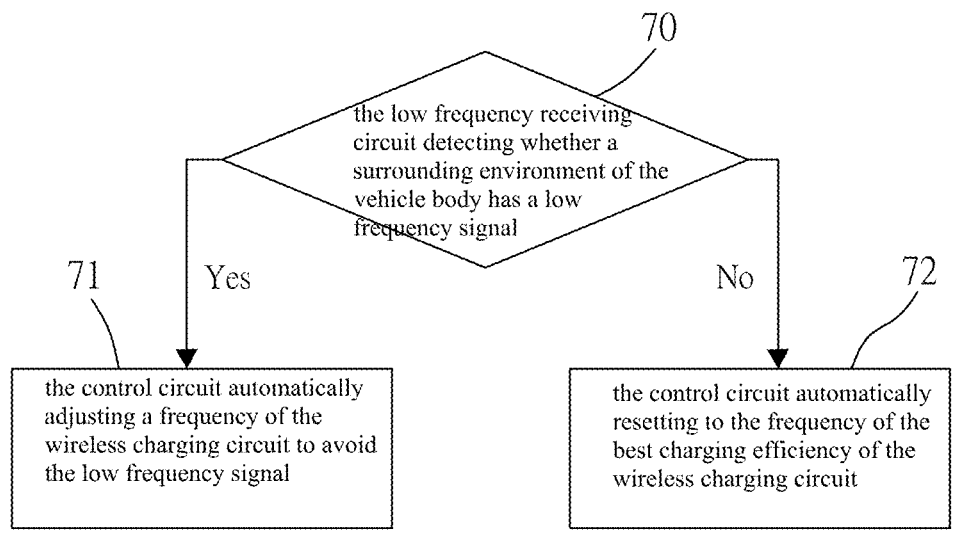
FIG. 24 is a flow chart of the steps of the control method of the multifunctional smart holder according to a further specific embodiment of the present invention.

Finally, please refer to FIG. 23 and compare with FIG. 24. FIG. 24 is a flow chart of the steps of the control method of the multifunctional smart holder according to a further specific embodiment of the present invention.

In one embodiment, when the wireless charging circuit 22 of the multifunctional smart holder 20 performs the wireless charging program on the portable device 18, the operating frequency is between 80 and 200 KHz, so it is very likely to interfere with a low frequency signal (about 125 kHz) generated by a low frequency transmitting unit of the vehicle body 90 during the process of the wireless charging program. Moreover, the low frequency signal forms a two-way communication with a radio-frequency signal, so that a two-way identity authentication program can be complete between the vehicle body 90 and an identification component 35 (the identification component 35 can be a key or other equivalent). If the identity authentication is determined to be correct, the vehicle body 90 will automatically open the door, and the driver only needs to press a button to activate the vehicle body 90 after getting on the vehicle, and this part is a conventional technology, so the details are not described herein. The difference between the prior art and the technology of the present invention, that being worthy to mention is that, the multifunctional smart holder 20 further comprises a low frequency receiving circuit. 36. The low frequency receiving circuit 36 is used to detect a low frequency signal in a surrounding environment of the vehicle body 90. When the low frequency receiving circuit 36 detects that the surrounding environment of the vehicle body 90 has a low frequency signal generated, the control circuit 21 automatically adjusts a frequency of the wireless charging circuit 22 to avoid the low frequency signal (refer to step S71 shown in FIG. 24). Conversely, when the low frequency receiving circuit 36 did not detect that the surrounding environment of the vehicle body 90 has a low frequency signal, the control circuit 21 automatically resets to the frequency of the best charging efficiency of the wireless charging circuit 22 (refer to step S72 shown in FIG. 24). In this way, the defect of the low frequency signal of the vehicle body 90 being interfered by the wireless charging circuit 22 when the identification component 35 and the vehicle body 90 perform the two-way identity authentication program can be substantially avoided.

The present invention has been described with reference to the preferred embodiments thereof, however the above description is only for the purpose of facilitating the understanding of the present invention by those skilled in the art, and is not intended to limit the scope of the appended claims of the present invention. In the same spirit of the present invention, various equivalent changes can be conceived by those skilled in the art. For example, between the directly connected circuit components, circuit components that do not affect the main functions of the circuit, such as switches, etc., can be interposed. All of these can be derived analogously from the teachings of the present invention. In addition, the illustrated embodiments are not limited to be applied separately, and can be applied in combination, such as, but not limited to, the combination of two embodiments. Therefore, the scope of the present invention should be construed as covering the above and all other equivalents. In addition, any embodiment of the present invention is not required to achieve all of the objects or advantages, and therefore, any one of the claims is not limited thereto.

What is claimed is:

1. A multifunctional smart holder, for placing on a vehicle device, and the multifunctional smart holder being used for holding a portable device, the multifunctional smart holder comprising:
    a near-field sensing circuit for performing a near-field sensing program to sense a near-field distance between an object to be tested based on a near-field sensing signal and the multifunctional smart holder to generate the near-field sensing signal;
    a wireless charging circuit for performing a wireless charging program on the portable device;
    a control circuit for determining whether the portable device being placed in the multifunctional smart holder, or being taken out from the multifunctional smart holder according to the near-field sensing signal, so that the multifunctional smart holder clamping in response to the portable device being placed in the multifunctional smart holder or releasing the portable device in response to the portable device being taken out from the multifunctional smart holder;
    wherein the control circuit further comprises an analog-to-digital converter (ADC) for converting the near-field sensing signal into a digital near-field sensing signal;
    a median filter coupled to the analog-to-digital converter for performing a median filtering operation on the digital near-field sensing signal to filter out a surge noise in the digital near-field sensing signal; and
    a slew rate limiter coupled to the analog-to-digital converter for performing a slew rate limiting operation on the digital near-field sensing signal to filter out a drastic noise in the digital near-field sensing signal;
    wherein the control circuit generates an operational signal according to results of the median filtering operation and the slew rate limiting operation;
    wherein the control circuit performs a program for mitigating noise interference to reduce noise in the near-field sensing signal based on the operation signal,
    wherein at least part of the noise is generated when the wireless charging circuit performs the wireless charging program;
    and the program for mitigating noise interference comprises the median filtering operation and the slew rate limiting operation.

2. The multifunctional smart holder as claimed in claim 1, wherein the near-field sensing circuit comprises a placement sensor, and the object to be tested comprises the portable device, the near-field sensing program comprises a placement sensing program to sense a device distance between the portable device and the multifunctional smart holder based on signals detected by the placement sensor to generate a device sensing signal in the near-field sensing signal, so that the control circuit determines that the portable device is to be placed in the multifunctional smart holder, and causes the multifunctional smart holder to clamp the portable device.

3. The multifunctional smart holder as claimed in claim 2, wherein the near-field sensing circuit further comprises a take-out sensor, the object to be tested further comprises a human body part, and the near-field sensing program further comprises a take-out sensing program to sense a human body distance between the human body part and the multifunctional smart holder based on signals detected by the taken-out sensor to generate a human body sensing signal in the near-field sensing signal, so that the control circuit determines that the portable device is to be taken out from the multifunctional smart holder, and causes the multifunctional smart holder to release the portable device.

4. The multifunctional smart holder as claimed in claim 1, wherein the control circuit further comprises a low-pass filter for performing a low-pass filtering operation on the operation signal to generate a low-pass filter signal;
    wherein the control circuit generates a judgement signal according to whether a difference between the operation signal and the low-pass filter signal is greater than a preset threshold value to determine whether the portable device is to be placed in the multifunctional smart holder, or is to be taken out from the multifunctional smart holder;
    wherein the program for mitigating noise interference further comprises the low-pass filtering operation.

5. The multifunctional smart holder as claimed in claim 4, wherein the low-pass filtering operation comprises a moving average operation, wherein the low-pass filter performs the moving average operation on the operation signal to achieve low-pass filtering of the operation signal to generate the low-pass filter signal.

6. The multifunctional smart holder as claimed in claim 4, wherein the low-pass filtering operation comprises a self-learning procedure, wherein the low-pass filter performs the self-learning procedure on the operation signal to achieve low-pass filtering of the operation signal to generate the low-pass filter signal;
    wherein the self-learning procedure comprises:
    (A) calculating an initial average value of the operation signal;
    (B) comparing the operation signal with the initial average value;
    (C) when the operation signal is not less than the initial average value, increasing the initial average value to generate the low-pass filter signal;
    (D) when the operation signal is less than the initial average value, reducing the initial average value to generate the low-pass filter signal;
    (E) comparing the operation signal with the low-pass filter signal;
    (F) when the operation signal is not less than the low-pass filter signal, increasing the low-pass filter signal to generate a new low-pass filter signal;
    (G) when the operation signal is less than the low-pass filter signal, reducing the low-pass filter signal to generate the new low-pass filter signal; and
    (H) repeating the step (E).

7. The multifunctional smart holder as claimed in claim 4, wherein the control circuit further comprises a debounce circuit for performing a debounce operation on a difference, the judgement signal or the operation signal to prevent multiple signals in the near-field sensing signal from triggering noise; wherein the program for mitigating noise interference further comprises the debounce operation.

8. The multifunctional smart holder as claimed in claim 7, wherein the debounce circuit comprises a hysteresis circuit, and the debounce operation comprises a hysteresis operation to prevent the multiple signals from triggering noise.

9. The multifunctional smart holder as claimed in claim 1, wherein the control circuit comprises a micro-control unit (MCU) for using as at least one of the analog-to-digital converter, the median filter, the slew rate limiter, the low-pass filter and the debounce circuit.

10. The multifunctional smart holder as claimed in claim 1, further comprising:
 a driving motor for extending or contracting two clamping arms of the multifunctional smart holder with the multifunctional smart holder, wherein:
 when the control circuit determines that the multifunctional smart holder needs to clamp the portable device according to the near-field sensing signal, the control circuit notifies the driving motor to contract the two clamping arms of the multifunctional smart holder, so that the multifunctional smart holder clamps the portable device; and
 when the control circuit determines that the multifunctional smart holder needs to release the portable device according to the near-field sensing signal, the control circuit notifies the driving motor to extend the two clamping arms of the multifunctional smart holder, so that the multifunctional smart holder releases the portable device.

11. The multifunctional smart holder as claimed in claim 1, further comprising:
 a vibration sensor for detecting whether a vehicle body placed with the multifunctional smart holder having a vibration, wherein when the vibration sensor detects that the vehicle body has a vibration, the vibration sensor notifies the control circuit to turn on a lighting device of the vehicle body to light up the interior of the vehicle body, display the brand inside the vehicle body or generate a warning function.

12. The multifunctional smart holder as claimed in claim 1, further comprising:
 a gravity sensor (G-sensor) for detecting whether a vehicle body placed with the multifunctional smart holder being moving, wherein when the gravity sensor detects that the vehicle body is moving, the gravity sensor notifies the control circuit to turn on an in-vehicle anti-theft alarm system of the vehicle body, thereby enables the portable device and the multifunctional smart holder to perform an identity authentication program by Bluetooth connection for anti-theft alarm.

13. The multifunctional smart holder as claimed in claim 1, further comprising:
 a Bluetooth device for connecting with the portable device via Bluetooth, thereby when the portable device playing music or a video stored in the portable device, the Bluetooth device notifying the control circuit to cause the control circuit to notify a sound playback device in the vehicle body to output the music or video of the portable device; or
 when an identity authentication program being required, the Bluetooth device notifying the control circuit to cause the control circuit to turn on an in-vehicle anti-theft alarm system of the vehicle body, thereby enabling the portable device and the multifunctional smart holder to perform an identity authentication program by Bluetooth connection for anti-theft alarm.

14. The multifunctional smart holder as claimed in claim 1, further comprising:
 an identification component for connecting to the multifunctional smart holder to perform an identity authentication program.

15. The multifunctional smart holder as claimed in claim 14, further comprising:
 a low frequency receiving circuit for detecting a low frequency signal in a surrounding environment of the vehicle body, when the low frequency receiving circuit detecting that the surrounding environment of the vehicle body having a low frequency signal generated, the control circuit automatically adjusting a frequency of the wireless charging circuit to avoid the low frequency signal, and when the low frequency receiving circuit having not detected that the surrounding environment of the vehicle body having a low frequency signal, the control circuit automatically resetting to the frequency of the best charging efficiency of the wireless charging circuit.

16. A control method of a multifunctional smart holder comprising a near-field sensing circuit, a wireless charging circuit, and a control circuit, the control method comprising following steps of:
 providing a multifunctional smart holder for placing on a vehicle device, and the multifunctional smart holder being used for holding a portable device;
 the multifunctional smart holder performing, by the near-field sensing circuit, a near-field sensing program to sense a near-field distance between an object to be tested based on a near-field sensing signal and the multifunctional smart holder to generate the near-field sensing signal;
 the multifunctional smart holder performing, by the wireless charging circuit, a wireless charging program on the portable device;
 the multifunctional smart holder determining, by the control circuit, whether the portable device being placed in the multifunctional smart holder, or being taken out from the multifunctional smart holder according to the near-field sensing signal, so that the multifunctional smart holder clamping in response to the portable device being placed in the multifunctional smart holder or releasing the portable device in response to the portable device being taken out from the multifunctional smart holder; and
 the multifunctional smart holder performing, by the control circuit, a program for mitigating noise interference to reduce noise in the near-field sensing signal based on an operational signal, wherein at least part of the noise is generated when performing the wireless charging program;
 wherein the program for mitigating noise interference comprises following steps of:
 (A) converting, by an analog-to-digital converter (ADC) of the control circuit, the near-field sensing signal into a digital near-field sensing signal;
 (B) performing, by a median filter of the control circuit coupled to the ADC, a median filtering operation on the digital near-field sensing signal to filter out a surge noise in the digital near-field sensing signal;
 (C) performing, by a slew rate limiter of the control circuit coupled to the ADC, a slew rate limiting operation on the digital near-field sensing signal to filter out a drastic noise in the digital near-field sensing signal; and (D) generating, by the control circuit, the operation signal according to results of the median filtering operation and the slew rate limiting operation.

17. The control method of the multifunctional smart holder as claimed in claim 16, wherein the near-field sensing circuit comprises a placement sensor and the objected to be tested comprises the portable device, wherein the near-field sensing program comprises a placement sensing program to sense a device distance between the portable device and the multifunctional smart holder based on signals detected by the placement sensor to generate a device sensing signal in the near-field sensing signal, in order to determine that the portable device is to be placed in the multifunctional smart holder, and causes the multifunctional smart holder to clamp the portable device.

18. The control method of the multifunctional smart holder as claimed in claim 17, wherein the near-field sensing circuit comprises a taken-out sensor and the objected to be tested comprise a human body part, wherein the near-field sensing program further comprises a take-out sensing program to sense a human body distance between the human body part and the multifunctional smart holder based on signals detected by the taken-out sensor to generate a human body sensing signal in the near-field sensing signal, so that the control circuit determines that the portable device is to be taken out from the multifunctional smart holder, and causes the multifunctional smart holder to release the portable device.

19. The control method of the multifunctional smart holder as claimed in claim 16, wherein the program for mitigating noise interference further comprises following steps of:
(E) performing, by a low pass filter of the control circuit, a low-pass filtering operation on the operation signal to generate a low-pass filter signal;
wherein the multifunctional smart holder generates a judgement signal according to whether a difference between the operation signal and the low-pass filter signal is greater than a preset threshold value to determine whether the portable device is to be placed in the multifunctional smart holder, or is to be taken out from the multifunctional smart holder.

20. The control method of the multifunctional smart holder as claimed in claim 19, wherein the low-pass filtering operation comprises a moving average operation to perform the moving average operation on the operation signal to achieve low-pass filtering of the operation signal to generate the low-pass filter signal.

21. The control method of the multifunctional smart holder as claimed in claim 19, wherein the low-pass filtering operation comprises a self-learning procedure to perform the self-learning procedure on the operation signal to achieve low-pass filtering of the operation signal to generate the low-pass filter signal;
wherein the self-learning procedure comprises:
(E1) calculating an initial average value of the operation signal;
(E2) comparing the operation signal with the initial average value;
(E3) when the operation signal is not less than the initial average value, increasing the initial average value to generate the low-pass filter signal;
(E4) when the operation signal is less than the initial average value, reducing the initial average value to generate the low-pass filter signal;
(E5) comparing the operation signal with the low-pass filter signal;
(E6) when the operation signal is not less than the low-pass filter signal, increasing the low-pass filter signal to generate a new low-pass filter signal;
(E7) when the operation signal is less than the low-pass filter signal, reducing the low-pass filter signal to generate the new low-pass filter signal; and
(E8) repeating the step (E5).

22. The control method of the multifunctional smart holder as claimed in claim 19, wherein the program for mitigating noise interference further comprises a debounce operation for performing a debounce operation, by a debounce circuit of the control circuit, on a difference, the judgement signal or the operation signal to prevent multiple signals in the near-field sensing signal from triggering noise.

23. The control method of the multifunctional smart holder as claimed in claim 22, wherein the debounce operation comprises a hysteresis operation to prevent the multiple signals from triggering noise.

24. The control method of the multifunctional smart holder as claimed in claim 16, further comprising:
extending or contracting, by a driving motor of the multifunctional smart holder, two clamping arms of the multifunctional smart holder, wherein:
when determining that the multifunctional smart holder needs to clamp the portable device according to the near-field sensing signal, contracting, by the driving motor in response to an instruction from the control circuit, the two clamping arms of the multifunctional smart holder, so that the multifunctional smart holder clamps the portable device; and
when determining that the multifunctional smart holder needs to release the portable device according to the near-field sensing signal, extending, by the driving motor in response to an instruction from the control circuit, the two clamping arms of the multifunctional smart holder, so that the multifunctional smart holder releases the portable device.

25. The control method of the multifunctional smart holder as claimed in claim 16, further comprising:
detecting, by a vibration sensor of the multifunctional smart holder, whether a vehicle body placed with the multifunctional smart holder having a vibration, wherein when detecting that the vehicle body has a vibration, turning on, by the control circuit, a lighting device of the vehicle body to light up the interior of the vehicle body, display the brand inside the vehicle body or generate a warning function.

26. The control method of the multifunctional smart holder as claimed in claim 16, further comprising:
detecting, by a gravity sensor (G-sensor) of the multifunctional smart holder, whether a vehicle body placed with the multifunctional smart holder being moving, wherein when detecting that the vehicle body is moving, turning on, by the control circuit, an in-vehicle anti-theft alarm system of the vehicle body, thereby enabling the portable device and the multifunctional smart holder to perform an identity authentication program by Bluetooth connection for anti-theft alarm.

27. The control method of the multifunctional smart holder as claimed in claim 16, further comprising:
connecting the multifunctional smart holder and the portable device with each other via Bluetooth using a Bluetooth device of the multifunctional smart holder, thereby when the portable device playing music or a video stored in the portable device, the multifunctional smart holder notifying a sound playback device in the vehicle body to output the music or video of the portable device; or when an identity authentication program being required, the multifunctional smart holder turning on an in-vehicle anti-theft alarm system of the vehicle body, thereby enabling the portable device and the multifunctional smart holder to perform an identity authentication program by Bluetooth connection for anti-theft alarm.

28. The control method of the multifunctional smart holder as claimed in claim 16, further comprising:

connecting the multifunctional smart holder with an identification component to perform an identity authentication program, wherein when a low frequency receiving circuit detects that a surrounding environment of the vehicle body has a low frequency signal generated, the control circuit automatically adjusts a frequency of the wireless charging circuit to avoid the low frequency signal, and when the low frequency receiving circuit did not detect that the surrounding environment of the vehicle body has a low frequency signal, the control circuit automatically resets to the frequency of the best charging efficiency of the wireless charging circuit.

* * * * *